(12) United States Patent
Chappus et al.

(10) Patent No.: US 11,185,955 B2
(45) Date of Patent: Nov. 30, 2021

(54) TEMPLATE SUPPORT FOR WORKPIECE

(71) Applicant: Norgren Automation Solutions, LLC, Saline, MI (US)

(72) Inventors: Corey Chappus, Armada, MI (US); Vincent C. Rabaut, III, Grosse Pointe, MI (US); Dale Lesh, Sterling Heights, MI (US); Scott Rollo, Chesterfield, MI (US); Donovan Brown, Shelby Township, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 654 days.

(21) Appl. No.: 16/077,858

(22) PCT Filed: Feb. 15, 2017

(86) PCT No.: PCT/US2017/017927
§ 371 (c)(1),
(2) Date: Aug. 14, 2018

(87) PCT Pub. No.: WO2017/142919
PCT Pub. Date: Aug. 24, 2017

(65) Prior Publication Data
US 2019/0176277 A1    Jun. 13, 2019

Related U.S. Application Data

(60) Provisional application No. 62/295,378, filed on Feb. 15, 2016.

(51) Int. Cl.
*B23Q 1/03* (2006.01)
*F16M 11/04* (2006.01)
*B23Q 3/00* (2006.01)

(52) U.S. Cl.
CPC .......... *B23Q 1/032* (2013.01); *F16M 11/041* (2013.01); *B23Q 3/002* (2013.01)

(58) Field of Classification Search
CPC ... B23Q 3/00; B23Q 3/06; B23Q 1/03; B23Q 1/062; B23Q 1/032; B23Q 1/035;
(Continued)

(56) References Cited

U.S. PATENT DOCUMENTS 3,318,486 A    5/1967 Felix
3,396,851 A    8/1968 Buckner et al.
(Continued)

FOREIGN PATENT DOCUMENTS

DE    4037132 A1    5/1992
EP    2743559 A2 *  6/2014 ........... F16M 11/041
(Continued)

OTHER PUBLICATIONS

International Search Report, PCT/US2017/017927, dated May 31, 2017.
(Continued)

*Primary Examiner* — Tyrone V Hall, Jr.
*Assistant Examiner* — Abbie E Quann
(74) *Attorney, Agent, or Firm* — McDonnell Boehnen Hulbert & Berghoff LLP

(57) ABSTRACT

A manufacturing includes a template support and a plurality of template members. The template support comprises a structural member, a first rail, and a second rail. The first rail is coupled to the structural member, and is positioned outward of the first side of the structural member and extends parallel with the structural member. The second rail is movably coupled to the structural member and is normally biased outward to an outward position in which second rail is parallel with the structural member. Each template member is coupled to the template support when the first rail is
(Continued)

positioned in a first recess thereof and the second rail is in the outward position in a second recess thereof, and is removable from the template support when the second rail is in an inward position and out of the second recess.

15 Claims, 21 Drawing Sheets

(58) Field of Classification Search
 CPC ...... B23Q 1/037; F16M 11/041; F16M 13/00; B25B 11/00; B25B 11/02
 USPC .................................................. 269/55, 291
 See application file for complete search history.

(56) References Cited

U.S. PATENT DOCUMENTS

| | | |
|---|---|---|
| 3,744,647 A | 7/1973 | Jelinek |
| 4,641,515 A | 2/1987 | Braun et al. |
| 4,936,560 A | 6/1990 | Barozzi et al. |
| 5,033,178 A | 7/1991 | Woods |
| 5,887,733 A | 3/1999 | Harvey et al. |
| 6,606,955 B2 | 8/2003 | Warren |
| 7,942,394 B2 | 5/2011 | Moncavage |
| 8,109,493 B2 | 2/2012 | Koskovich et al. |
| 2008/0203640 A1 | 8/2008 | Halford |
| 2009/0140482 A1 | 6/2009 | Saberton et al. |
| 2014/0103594 A1* | 4/2014 | Drummond ............ B25B 11/00 269/134 |

FOREIGN PATENT DOCUMENTS

| | | | |
|---|---|---|---|
| EP | 2743559 A2 | 6/2014 | |
| WO | 2004054734 A1 | 7/2004 | |
| WO | 2007022143 A1 | 2/2007 | |
| WO | 2013188663 A1 | 12/2013 | |
| WO | WO-2013188663 A1 * | 12/2013 | ............ B21D 37/02 |

OTHER PUBLICATIONS

International Search Report and Written Opinion, PCT/US2013/045648, dated Aug. 19, 2013.

* cited by examiner

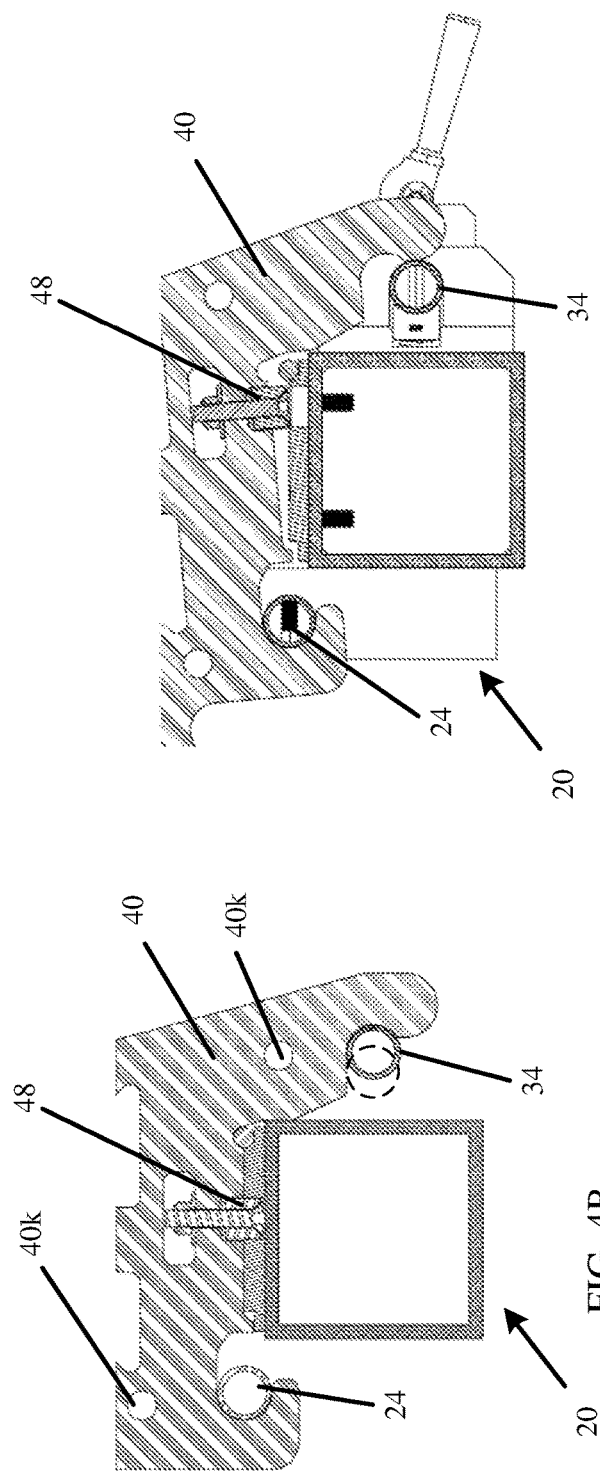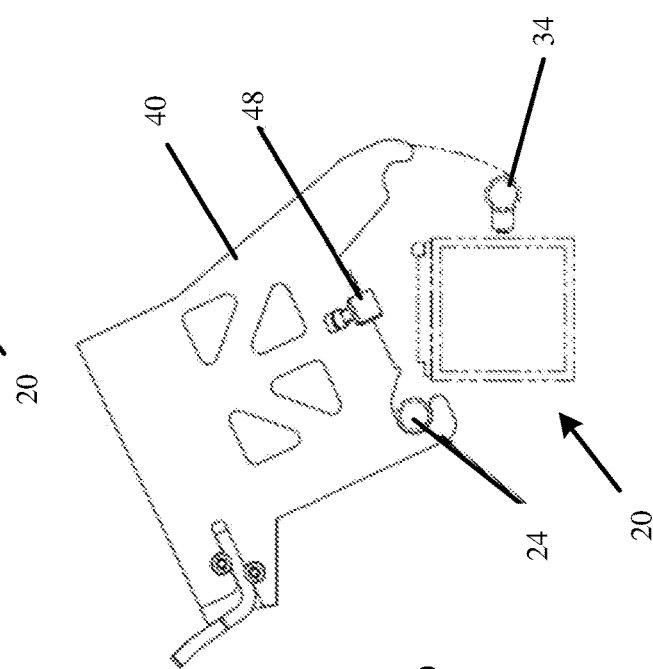
FIG. 4B
FIG. 4C
FIG. 4D

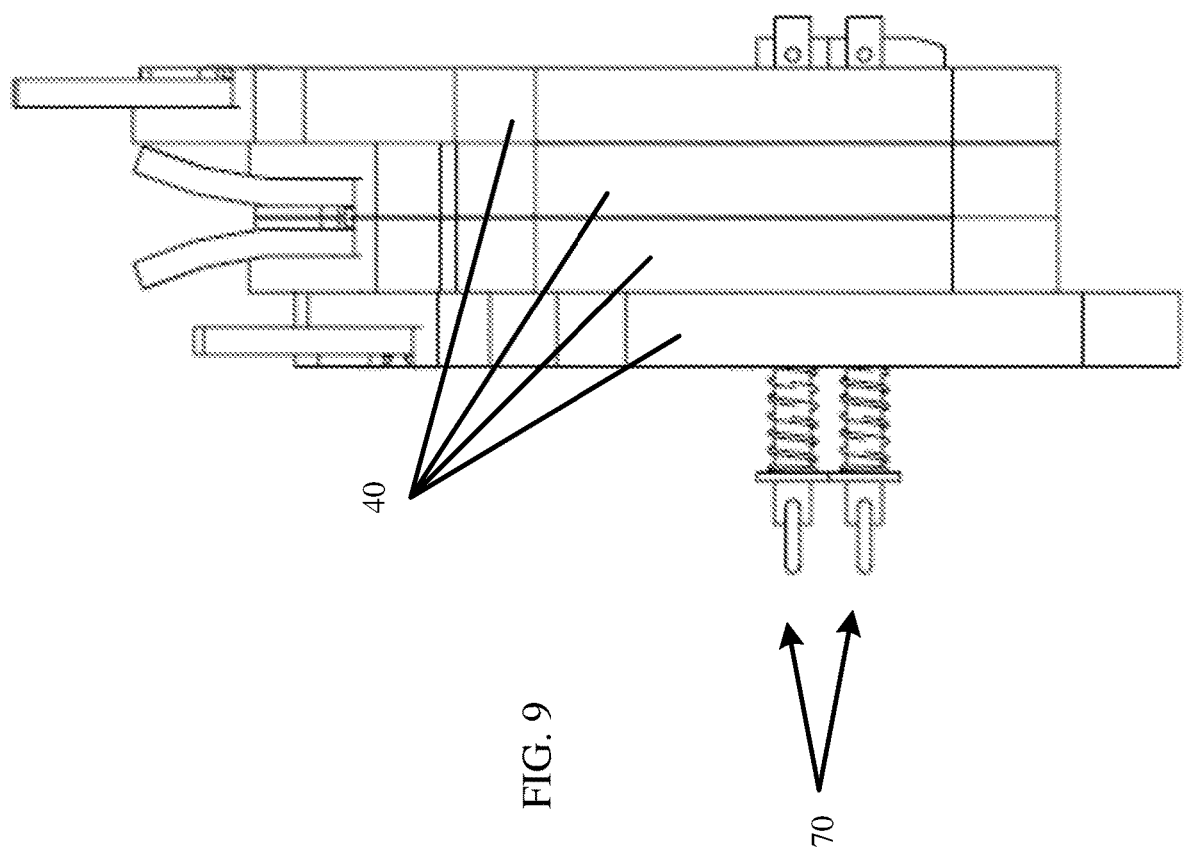

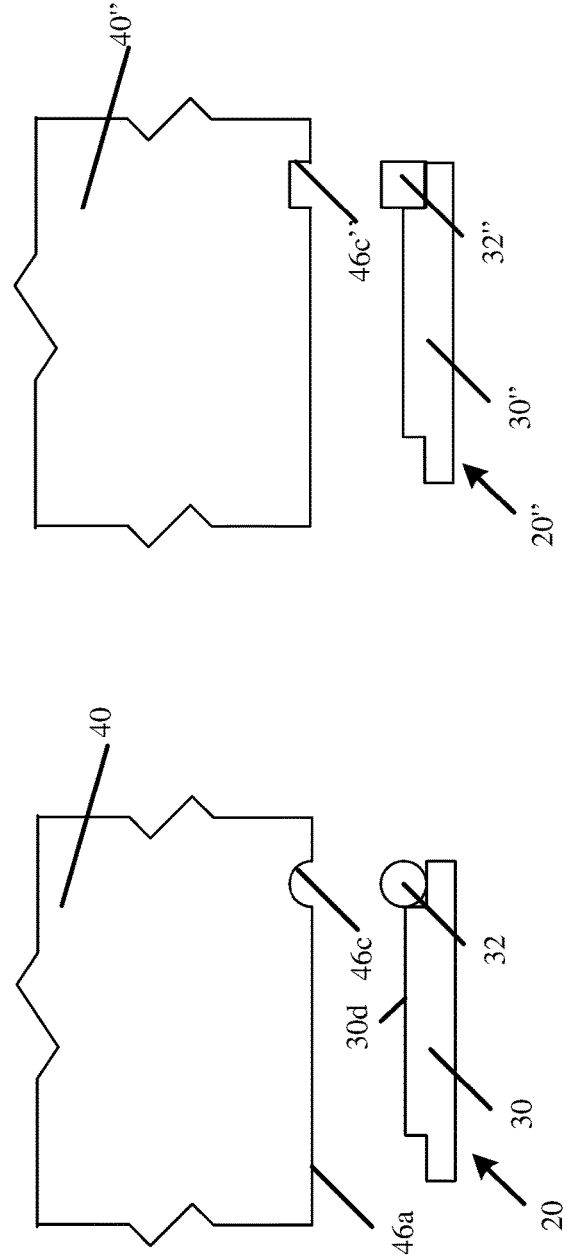
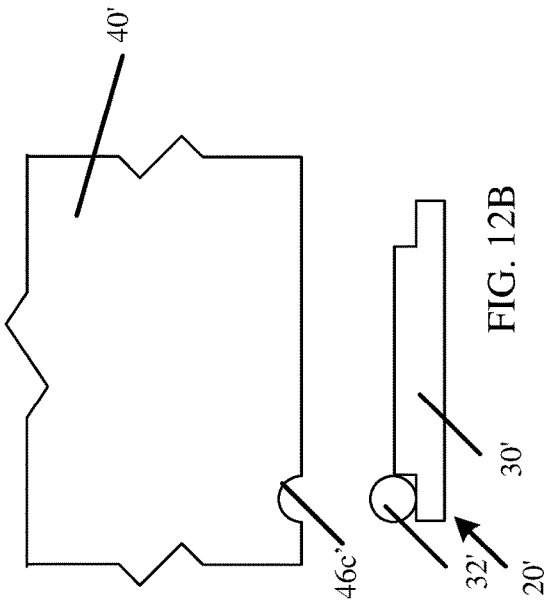
FIG. 12A
FIG. 12B
FIG. 12C

TEMPLATE SUPPORT FOR WORKPIECE

CROSS-REFERENCE TO RELATED APPLICATIONS

This application claims priority to and the benefit of U.S. Provisional Application No. 62/295,378, filed Feb. 15, 2016, the disclosure of which is incorporated herein by reference in its entirety.

TECHNICAL FIELD

The present disclosure relates to a system and apparatus for supporting a workpiece, such as a sheet metal panel.

BACKGROUND

In the manufacturing industry, such as the automotive industry, workpieces, such as sheet metal panels, are moved between stations at which the workpiece is held idly (e.g., to be gauged, measured, or held, between machining processes, etc.) and/or processed (e.g., machined). At idle stations, an apparatus for supporting a workpiece, such as those disclosed in U.S. Patent Application Publication No. 2013/0334379, which is incorporated herein by reference in its entirety, includes a plurality of gauge slice templates that are supported by a substantially planar master template connected to a base assembly.

The gauge slice templates are planar, nylon members that are spaced apart along the master template. Each of the gauge slice templates includes a top edge or surface that is contoured to complementarily and matingly engage an underside surface of the workpiece at a location of the workpiece. The gauge slice templates may, for example, support the workpiece at strategic locations to provide proper support of the workpiece to prevent deforming and/or denting of the workpiece as the workpiece is engaged by a moving apparatus that lifts and removes and moved from the supporting apparatus.

The gauge slice templates are each removably coupled to the master template at locations of the master template, which correspond to the locations at which the gauge slice template engages the workpiece. For example, the gauge slice templates may be secured to the master template with a locking rail, which is received within a C-shaped aperture of each gauge slice template. The locking rail is rotatable but held in a fixed position on the master template. In cross-section, the locking rail has two parallel flats with a pair of curved peripheral segments therebetween. The gauge slice template is moved downward to receive the locking rail in the C-shaped aperture with the two parallel flats being perpendicular to a narrow opening of the C-shaped aperture. The locking rail is then rotated 90 degrees, thereby causing the curved segments to engage the C-shaped aperture and secure the gauge slice template to the locking rail.

The gauge slice templates and the master template may be configured to locate and support each gauge slice template at a proper location on the master template. For example, the gauge slice templates and the master template may include corresponding indicia, or each gauge slice template may include at two protrusions formed integrally therewith that are received in two different apertures out of many more apertures in a mounting platform of the master template.

The gauge slice templates may also be removed from the master template and stored together. For example, the gauge slice templates may be coupled to each other with cross pivoting linkages or telescopic rods, or may be mounted to a storage template that engages the apertures by which the gauge slice templates are otherwise mounted to the master template.

As an alternative to the gauge slice templates having a contoured surface that engages the underside of the workpiece, the gauge slice templates may include tools (e.g., vacuum grippers or power-operated clamps) that are connected to and supported by the gauge slice templates and that serve as workpiece engaging structures or members.

It may be advantageous to provide a workpiece supporting apparatus having alternative configurations to those described previously, including alternative mechanisms, among others, for securing template members to a template support, locating the template members relative to the template support, storing the template members, and engaging the workpiece.

SUMMARY

A manufacturing includes a template support and a plurality of template members. The template members are removably coupleable to the template support at axially spaced apart locations, and and are configured to cooperatively configured to support a workpiece. The template support comprises a structural member, a first rail, and a second rail. The structural member includes a first side and a second side extending axially between a first end and a second end of the structural member. The first rail is coupled to the structural member, and is positioned outward of the first side of the structural member and extends parallel with the structural member. The second rail is movably coupled to the structural member, is positioned outward of the first side of the structural member, and is normally biased outward relative to the structural member from an inward position to an outward position in which second rail is parallel with the structural member. Each template member comprises an upper surface, a first recess, and a second recess. The upper surface is uniquely contoured in a complementary manner to an underside of the workpiece. The first recess is receivable on the first rail, and the second recess is receivable on the second rail. Each template member is coupled to the template support when the first rail is positioned in the first recess and the second rail is in the outward position in the second recess, and is removable from the template support when the second rail is in the inward position and out of the second recess.

According to another implementation, a manufacturing system includes a support system and a set of template members. The support system includes a primary structure, a first rail, and a second rail. The primary structure extends in an axial direction. The first rail is fixedly coupled to and extends parallel with the primary structure. The second rail is movably coupled to the primary structure to be movable transversely between an inward position and an outward position in which second rail is parallel with the primary structure. The template members are removably coupleable to the support system at different axial positions for cooperatively supporting a workpiece. The second rail is movable toward the inward position to receive and release the template members from the support system.

The second rail may be movable to toward the outward position to couple the template members to the support system with the second rail. Each template member may include a first recess for receiving the first rail, and a second recess for receiving the second rail for coupling the template member to the support system. Each template member may include an upper surface uniquely contoured in a complementary manner to an underside of the workpiece. The primary structure may include a first side, a second side, and an upper side extending transversely between the first side and the second side with the first rail being positioned outward of the first side and at least partially above the upper side, and the second rail being positioned outward of the second side and at least partially below the upper side. Each template member may be coupleable to the support system with the second rail at only one of the axial positions.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4B is another cross-sectional view of the manufacturing system taken along line 4B-BB in FIG. 4, which shows the template member in a locked position relative to the template support.

FIG. 4C is an alternative cross-sectional view to FIG. 4B that shows the template member in a second initially engaging position relative to the template support.

FIG. 4D is an end view that shows the template member in a third disengaged position relative to the template support.

FIG. 9 is a side view of the set of template members shown in FIG. 8.

FIG. 12A is a schematic view of a template member and template support having corresponding mechanical coding features of a first embodiment.

FIG. 12B is a schematic view of a template member and template support having corresponding mechanical coding features of a second embodiment.

FIG. 12C is a schematic view of a template member and template support having corresponding mechanical coding features of a second embodiment.

DETAILED DESCRIPTION

Figure 1:
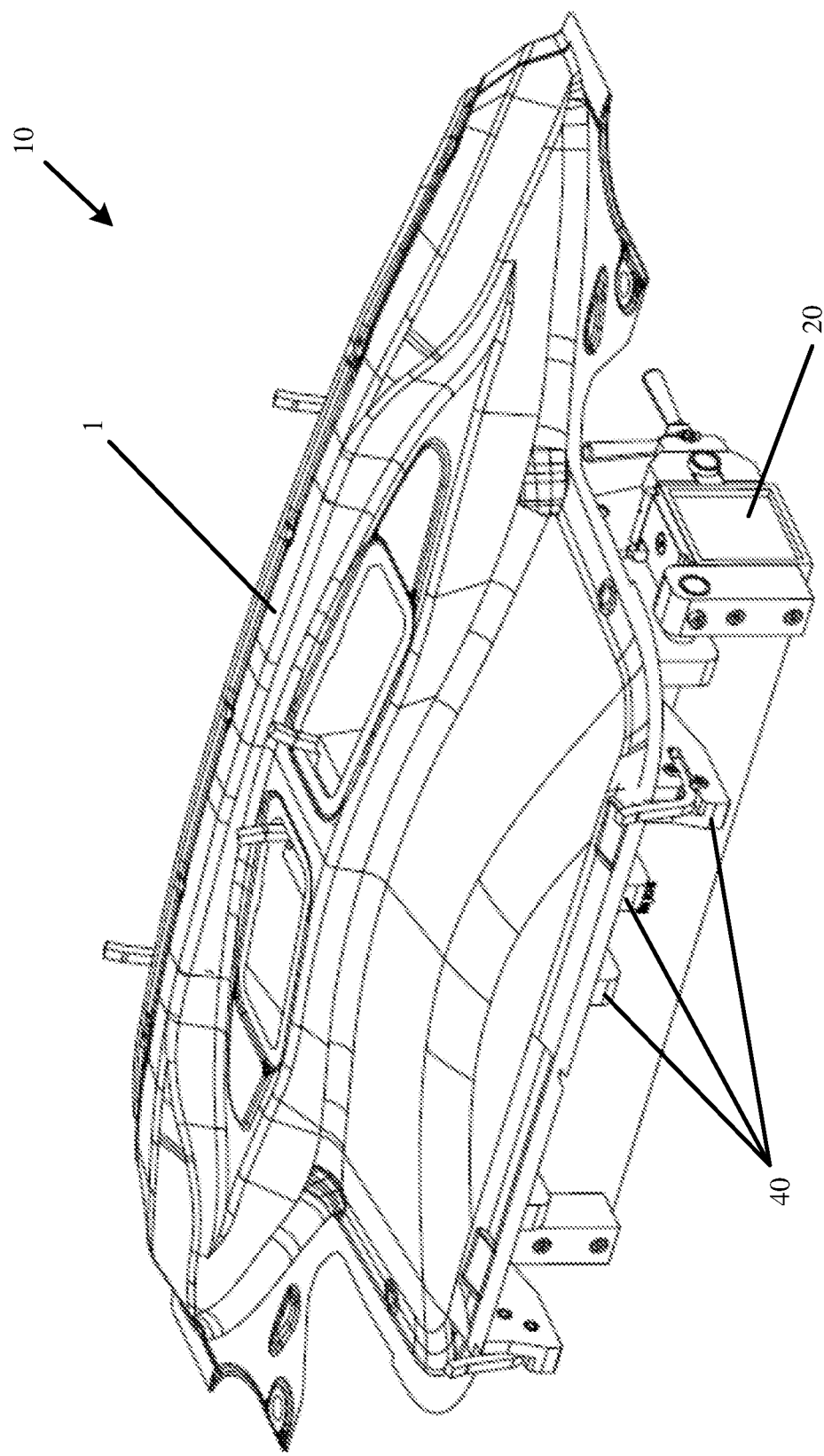
FIG. 1 is a perspective view of a manufacturing system according to an exemplary embodiment, which is supporting a workpiece.
Figure 2:
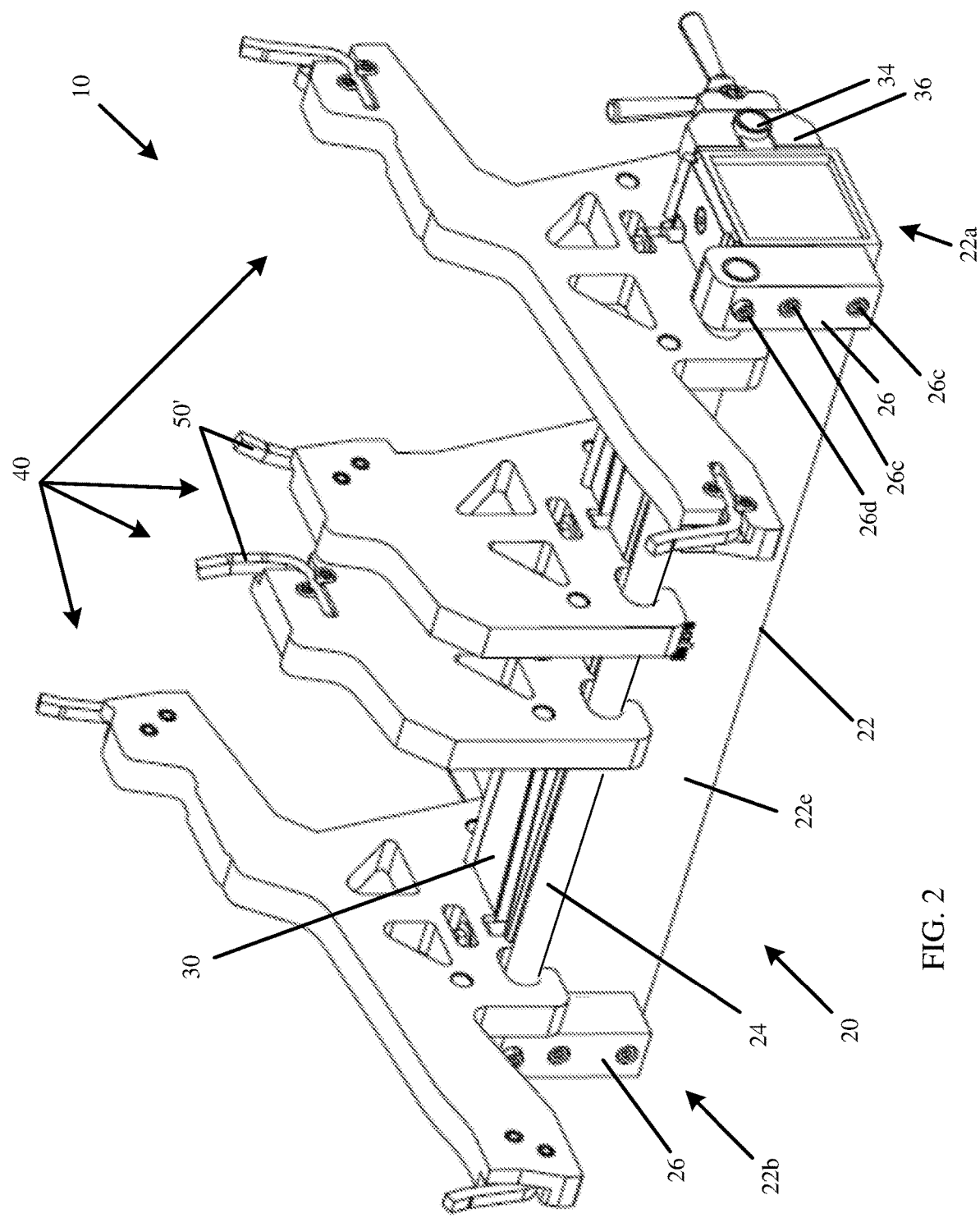
FIG. 2 is a perspective view of the manufacturing system shown in FIG. 1.
Figure 3:
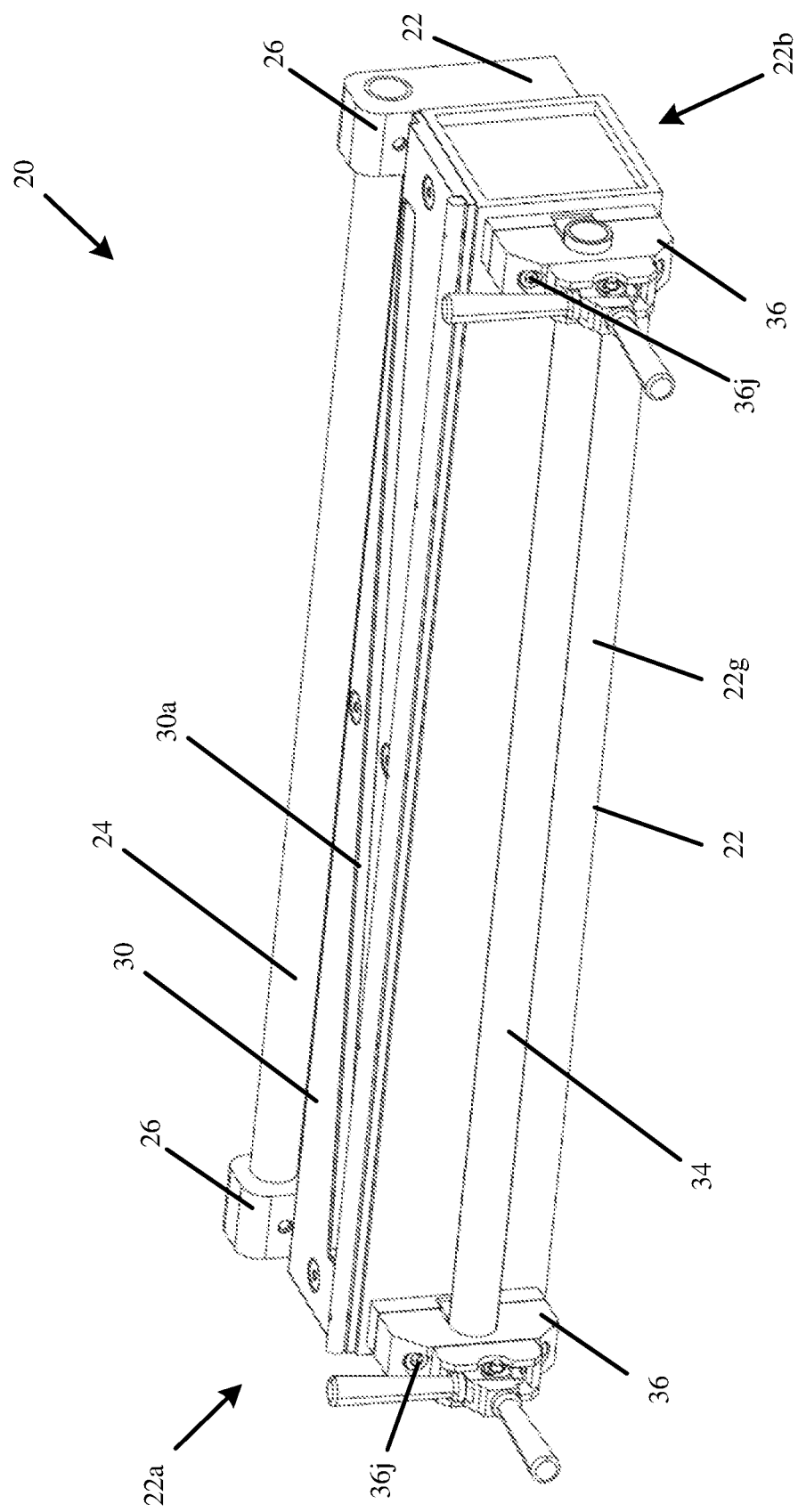
FIG. 3 is a perspective view of a template support of the manufacturing system shown in FIG. 2.

With reference to FIGS. 1-13B, a manufacturing system 10 is provided for supporting a workpiece 1. The workpiece 1 has a three-dimensional profile on an upper and/or lower surface thereof, which is engaged by the manufacturing system 10. The workpiece 1 may, for example, be a stamped component for a motor vehicle (e.g., body panel, body structure, etc.).

The manufacturing system 10 generally includes a base 12 (see, e.g., FIGS. 13A-13B), template support 20 (e.g., chassis, support system), and a plurality of template members 40 (e.g., workpiece engaging member or structure, gauge slice template, etc.). The base 12 is stationary and supports the template supports 20 in a fixed location (e.g., with brackets 14, shown in FIG. 13A). The template members 40 are removably coupled to the template support 20, and each engages a lower surface of the workpiece 1 to cooperatively support the workpiece 1 thereon. According to some embodiments, the manufacturing system 10 may include multiple template supports 20 and corresponding sets of template members 40 (see, e.g., FIGS. 13A-13B).

With reference to FIGS. 2-6A, the template support 20 generally includes a structural member 22 (e.g., a primary member, or primary structure), a fixed rail 24 (e.g., first or stationary rail or elongated member) coupled to and supported by the structural member 22 in fixed relation thereto, and a locking rail 34 (e.g., second or moving rail elongated member) coupled to and supported by the primary member 22 in moving relation thereto.

The primary member 22 is a generally rigid, elongated member having sufficient strength to support other components of the template support 20, template members 40, and the workpiece 1 thereon. The primary member 22 extends in an axial direction. The primary member 22 may be a tubular member having a generally constant cross-sectional shape (e.g., square or rectangular) along an axial length thereof, which extends straight between a first end 22a (e.g., proximate end) and a second end 22b (e.g., distal end). For example, the primary member 22 may include a first side 22e, a second side 22g, and an upper side 22d and a lower side 22f that extend transversely between the first side 22e and the second side 22g, which extend in an axial direction from the first end 22a to the second end 22b. The first end 22a and/or the second end 22b may be closed or covered by an end member 22c (e.g., cover). The primary member 22 is an extruded 6061 aluminum material. According to other exemplary embodiments, the primary member 22 may be configured differently, for example, having a different cross-sectional shape or being made from a different material.

For the purposes of understanding the position and orientation of the various components discussed herein, the term "axial" or similar typically refers to the direction of elongation (e.g., an axis) of the primary member 22, but may also be used in reference to another component or member. The term "transverse" or similar typically refers to a direction across or intersecting the primary member 22, but may also be used in reference to another component or member. The terms "inward," "outward," or similar are typically used with reference to the primary member 22 being central, but may also be used in reference to another component or member. Furthermore, directional terms in free space, such as "upward," "downward," "lower," "vertically," "elevation," "height," "horizontally," and similar are used for describing the manufacturing systems depicted statically in the figures, though it should be understood that the manufacturing systems and their components may be subject to other orientations while still within the scope of this disclosure (e.g., for moving manufacturing systems).

The fixed rail 24 is a generally rigid, elongated member that is fixedly coupled to the structural member 22 and is engageable by a first portion 42 (e.g., first outer segment or region) of each template member 40 (discussed in further detail below). More specifically, the fixed rail 24 extends parallel with the structural member 22 and provides a pivot axis about which the template member 40 may rotate into a secured position. The fixed rail 24 and the pivot axis formed thereby are positioned proximate a corner formed by the upper side 22*d* and the first side 22*e* of the structural member 22. For example, the fixed rail 24 may be a tubular member having a circular cross-section whose central axis is at an elevation approximately even with an upper surface of a locating plate 30. As discussed in further detail below, the locating plate 30 includes a locating slot 30*a* configured to receive a locating member 48 of the template member 40, and the elevation of the pivot axis formed by the fixed rail 24 relative to the upper surface of the locating plate 30 (e.g., being substantially coplanar therewith) facilitates receipt of the locating member 48 within the slot 30*a*. The fixed rail 24 is additionally positioned transversely outward of the first side 22*e* of the structural member 22 and may also be positioned at least partially above the upper side 22*d*. The fixed rail 24 may be a drawn over mandrel steel tube having a 25 mm diameter. According to other exemplary embodiments, the fixed rail 24 may be configured differently, for example, providing a pivot axis in a different location (e.g., further above or below the upper side 22*d* of the structural member 22, such as within 25% or 50% of the height of the structural member 22), or being made from a different material.

The fixed rail 24 is fixedly mounted to the first side 22*e* of the structural member 22 with two fixed brackets 26 (e.g., fixed mount). Each fixed bracket 26 is located axially proximate the first end 22*a* and second end 22*b* of the primary member 22, such that the fixed rail 24 spans the length of the primary member 22. The fixed brackets 26 each include a body portion 26*a* (e.g., member, segment, etc.) and an aperture 26*b* (e.g., hole, bore, etc.) extending axially through the body portion 26*a*. The aperture 26*b* is configured to receive the fixed rail 24, therein, so as to support the fixed rail 24 with the body portion 26*a*. The fixed bracket 26 is coupled to the first side 22*e* of the structural member 22, for example, with threaded fasteners 26*c*. The aperture 26*b* extends through the body portion 26*a* in an axial direction of the fixed rail 24 (i.e., parallel with the structural member 22), and has an inner periphery with a complementary shape and size to receive the fixed rail 24 to be received therein. The aperture 26*b* may, for example, be circular and concentric with the fixed rail 24, thereby having a central axis positioned proximate the corner formed by the upper side 22*d* and the first side 22*e* of the structural member 22. The fixed rail 24 and the fixed bracket 26 may additionally include corresponding apertures configured to receive an additional fastener 26*d* that prevents axial and rotational movement of the fixed rail 24 within the aperture 26*b*. Each fixed bracket 26 is a unitary member, for example of 6160 aluminum. Alternatively, the fixed brackets may be configured differently, for example, by connecting to the structural member 22 in a different manner (e.g., complementary male/female members), having a different shaped aperture (i.e., the same or different than the cross-section of the fixed rail 24), supporting the fixed rail 24 in a different manner (e.g., having an axially facing recess extending partially into the fixed bracket 26), being a multi-piece component, and/or being made from a different material. Furthermore, one or more additional brackets 26 may be provided at intermediate positions between the first end 22*a* and the second end 22*b* to provide an intermediate support for the fixed rail 24.

The locking rail 34 is a generally rigid, elongated member that is movably coupled to the structural member 22 and is engageable with a second portion 44 (e.g., second outer segment or region) of each template member 40 (discussed in further detail below). More specifically, the locking rail 34 extends parallel with the structural member 22, but may move transversely (i.e., transverse to the axis of the locking rail 34, such as horizontally) toward the structural member 22 (i.e. move inward, for example, to or toward an inward position shown in dashed lines in FIG. 4B) and away from the structural member 22 (i.e. move outward, for example, to or toward an outward position) to, respectively, disengage and engage each template member 40. As a result, the locking rail 34 is movable to or toward the outward position to couple (e.g., secure or lock) the template members 40 to the template support 20 with the locking rail 34. The locking rail 34 is positioned laterally outward from the second side 22*g* of the structural member 22 (i.e., opposite the first side 22*e*) at an intermediate elevation between the upper side 22*d* and the lower side 22*f* of the structural member 22 (e.g., at approximately a midpoint elevation). For example, the locking rail 34 is positioned at least partially below the upper side 22*d*.

As discussed in further detail below, the locking rail 34 is positioned relative to the fixed rail 24, such that as the template member 40 is received on the fixed rail 24 and rotated thereabout, the second portion 44 of the template member 40 engages the locking rail 34 and causes the locking rail 34 to displace inwardly and then outwardly to be received within a slot 44*a* (e.g., recess) in the second portion 44 of the template member 40. As is also discussed in further detail below, by providing the locking rail 34 at a lower elevation than the upper surface 30*d* of the locating plate 30, the locking rail 34 engages the template member 40 at a lower elevation, which provides torsional strength to prevent pivoting of the template member 40 about the locating plate 30 and maintain the template member 40 in a vertical orientation. The locking rail 34 may, for example, be configured the same as the fixed rail 24 by being a drawn over mandrel steel tube having a 25 mm diameter. Alternatively, the locking rail 34 may be configured differently, for example, by having a different cross-sectional shape, different material, and/or a different transverse or elevational mounting location.

The locking rail 34 is mounted in moving relation to the second side 22g of the structural member 22 with two locking brackets 36 (e.g., locking mount). The locking brackets 36 are configured to lock the locking rail 34 in the outward position to lock the template members 40 to the template support 20 with the locking rail 34. Each locking bracket 36 is coupled to and extends laterally outward from the second side 22g of the structural member 22. Each locking bracket 36 is positioned proximate the first end 22a or the second end 22b of the structural member 22, such that the locking rail 34 spans the length of the structural member 22. By spanning the length of the structural member 22, the locking rail 34 provides a single, continuous member that engages and simultaneously secures each template member 40 to the template support 20. Alternatively, the locking rail 34 may be coupled or connected to the structural member 22 in different manners, for example, with one or more additional locking brackets 36 positioned at intermediate locations between the first end 22a and the second end 22b of the structural member 22 and/or being provided as multiple elongated members if an intermediate locking bracket 36 is provided.

Figure 4:
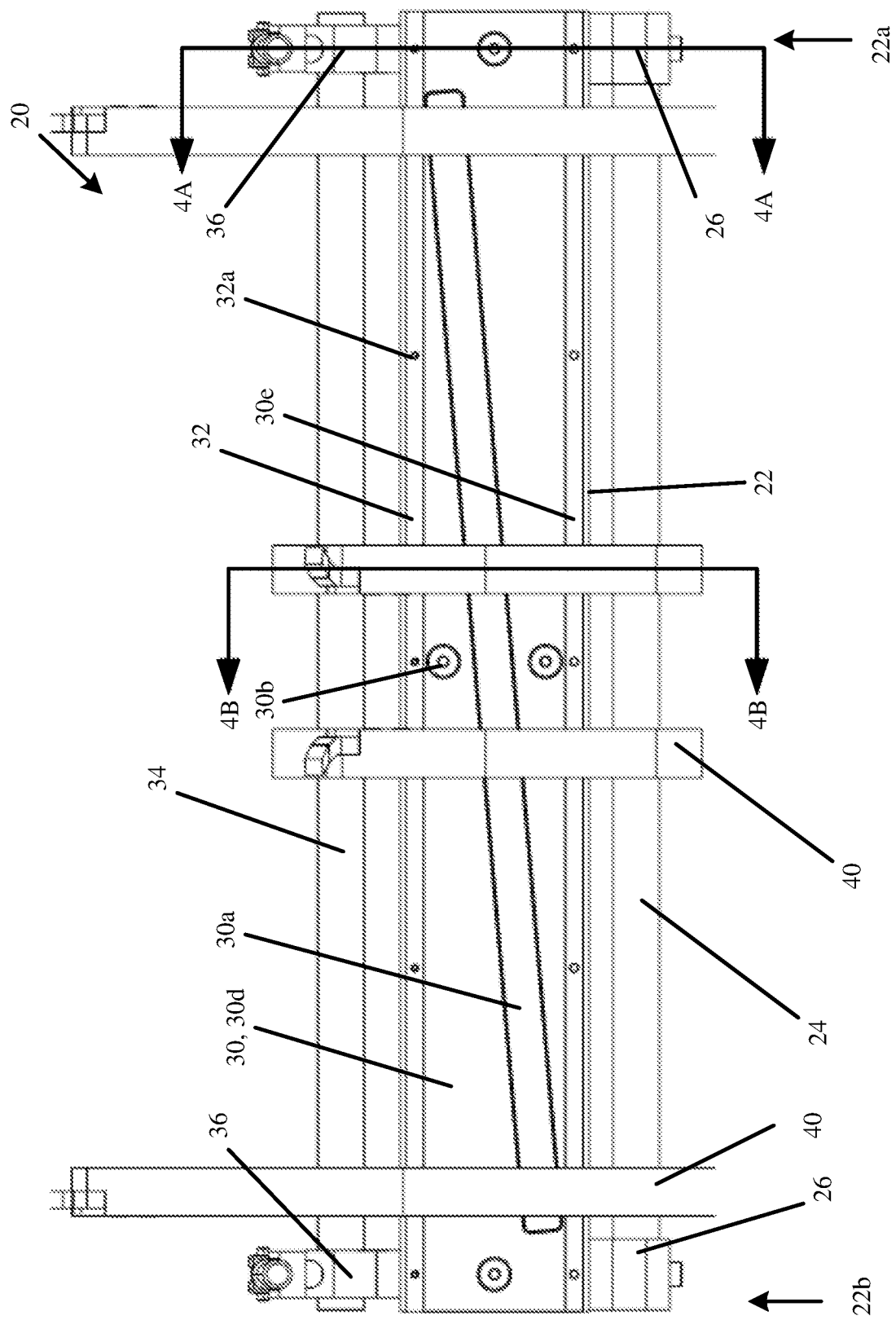
FIG. 4 is a top view of the manufacturing system shown in FIG. 2.
Figure 4A:
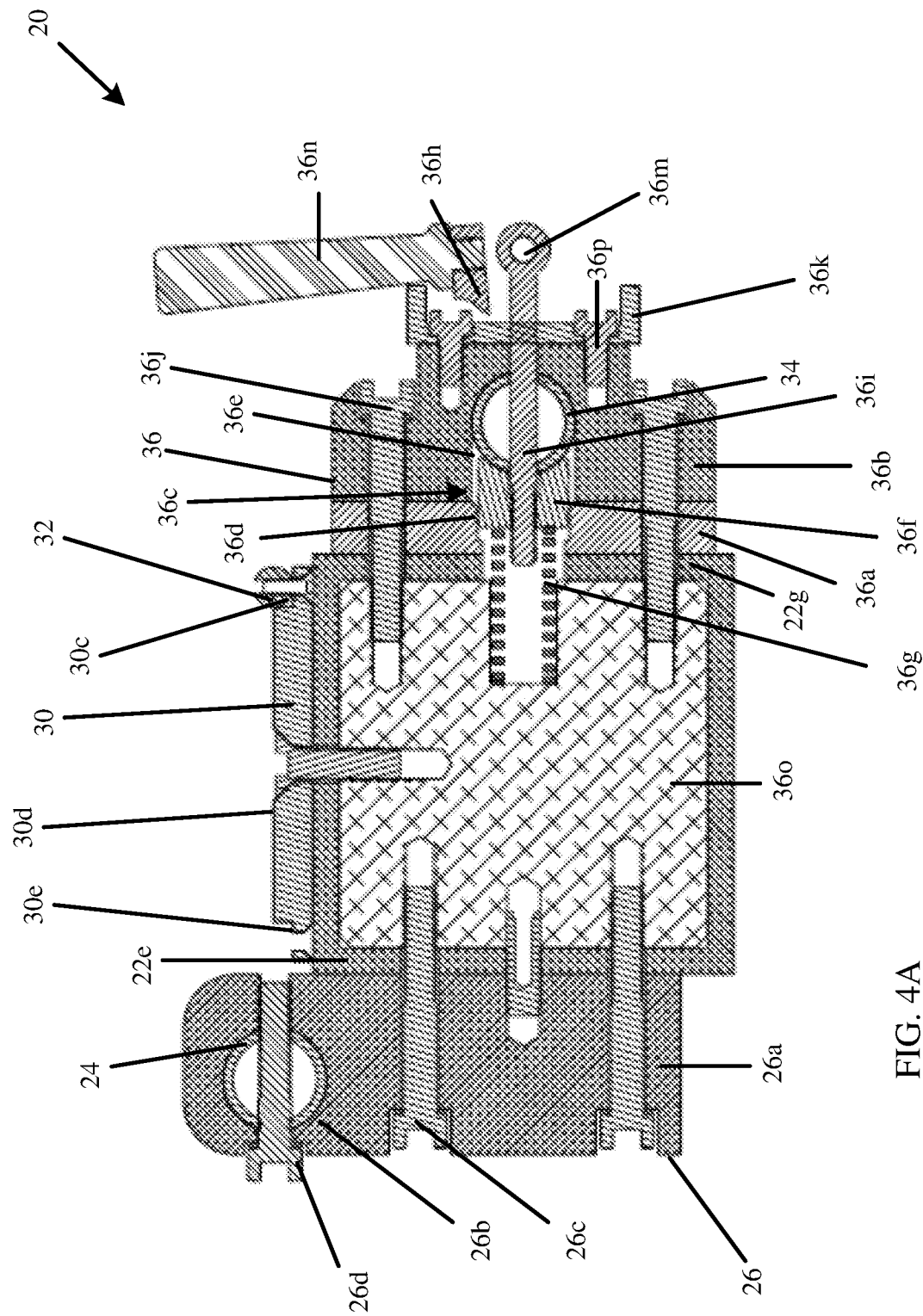
FIG. 4A is a cross-sectional view of the manufacturing system taken along line 4A-4A in FIG. 4 (shown without a template member).
Figure 5:
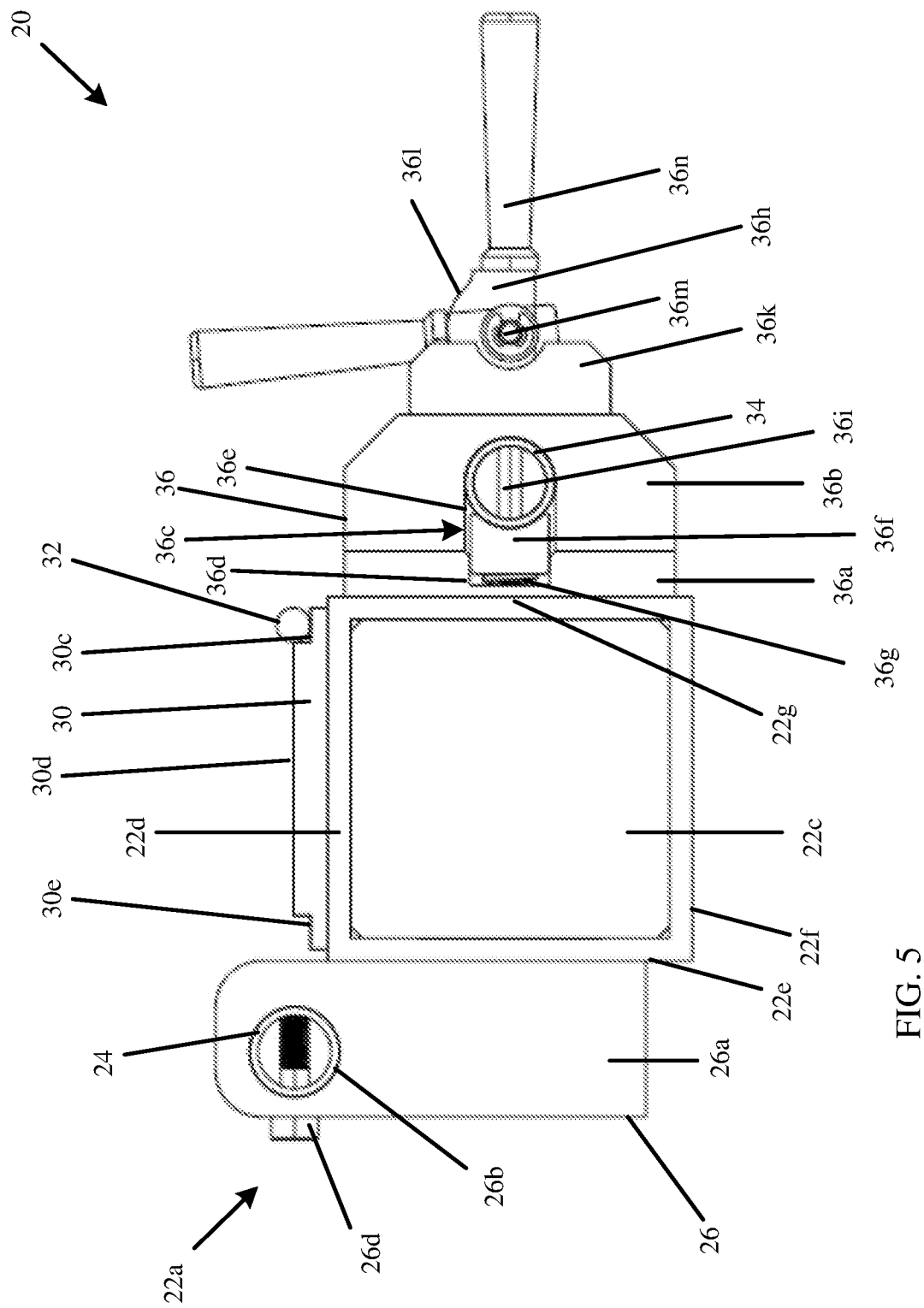
FIG. 5 is an end view of the template support shown in FIG. 3.

As best shown in FIGS. 4A and 5, each locking bracket 36 generally includes one or more rigid, stationary members that define a slot 36c in which the locking rail 34 moves transversely, a spring 36g that normally biases the locking rail 34 to the outward position (e.g., an outer or locking position), and a locking mechanism that prevents inward movement of the locking rail 34. The locking rail 34 is parallel with the structural member 22 while in the outward position. The rigid stationary members include a first stationary locking member 36a (e.g., inner or base member) and a second stationary locking member 36b (e.g., intermediate member) that cooperatively define the slot 36c (e.g., channel) in which the locking rail 34 moves transversely toward and away from the structural member 22 to, respectively, engage or disengage the template member 40. The first stationary locking member 36a is coupled to the second side 22g of the structural member 22, for example, with threaded fasteners 36j. The first stationary locking member 36a includes an inner slot portion 36d (e.g., inner slot) of the slot 36c, which is defined by upper and lower parallel surfaces. The second stationary locking member 36b is coupled to the first stationary locking member 36a (e.g., with the threaded fasteners 36j). The second stationary locking member 36b includes an outer slot portion 36e (e.g., outer slot) of the slot 36c, which is defined by upper and lower parallel surfaces and a closed outer end to retain the locking rail 34 within the slot 36c. The slot 36c is positioned at an intermediate height between the upper side 22d and the lower side 22f of the structural member 22 (e.g., approximately equidistant therebetween). Alternatively, the slot 36c and, thereby, the locking rail 34 may positioned at higher or lower elevations generally between the upper side 22d and lower side 22f of the structural member 22.

Each locking bracket 36 also includes a locking mechanism that generally comprises a rail engaging member 36f, a locking cam 36h, and a shaft 36i that couples the rail engaging member 36f to the locking cam 36h. The rail engaging member 36f is configured to slide transversely within the inner portion 36d of the slot 36c and apply an outward force against the locking rail 34. For example, the rail engaging member 36f includes parallel upper and lower surfaces (not labeled) that engage or slide proximate to the upper and lower surfaces defining the inner portion 36d of the slot 36c, an outer concave end that receives the locking rail 34 therein, and an inner end positioned closest to the second side 22g of the structural member 22 (e.g., proximate an inner end of the slot 36c).

The shaft 36i is coupled at an inner end to the rail engaging member 36f, extends through the locking rail 34 (i.e., in a radial direction relative to the axis of the locking rail 34), and is coupled at an outer end to the locking cam 36h. The shaft 36i may, for, example, be threadably coupled to the rail engaging member 36f.

The locking cam 36h is configured to pull the rail engaging member 36f via the shaft 36i to compress and lock the locking rail 34 against the outer end of the slot 36c (i.e., against the second stationary locking member 36b). The locking cam 36h includes a cam member 36l having a cammed surface that is eccentric to the axis of rotation 36m. As the cam member 36l is rotated about the axis 36m, the cam member 36l pulls the rail engaging member 36f outward. For example, the locking cam 36h may include a handle 36n that may be rotated approximately 90 degrees from a lower or unlocked position in which the locking rail 34 may be moved transversely inward to an upper or locked position in which the locking rail 34 is securely held transversely against the outer end of the slot 36c. In some of the figures, the handle 36n is simultaneously depicted in both the locked and unlocked positions. The locking cam 36h may, for example, be pivotally coupled to a third or outer stationary member 36k (e.g., with threaded fasteners 36p).

The spring 36g via the rail engaging member 36f, normally biases the locking rail 34 to its outer position against the outer end of the slot 36c. The spring 36g additionally allows the locking rail 34 to deflect inward (e.g., to or toward the inward position), as each template member 40 is moved into its secured position (e.g., receive) and to release each template member 40 from the template support 20. An inner end of the spring 36g bears inwardly against an inner bearing surface and outwardly against the inner surface of the rail engaging member 36f For example, the spring 36g may extend through the second side 22g of the structural member 22 and engage a bearing member 36o disposed within the structural member 22. The various fasteners (e.g., 26c, 36j) may also extend or thread into the bearing member 36o. The spring 36g may additionally be received around the shaft 36i. According to other exemplary embodiments, the spring 36g may be configured in other manners, for example, by bearing against another inner bearing surface (e.g., the first side 22e or the second side 22g of the structural member 22).

According to other exemplary embodiments, the locking bracket 36 may be configured in other manners, for example, with the first, second, and/or third stationary members 36a, 36b, 36k forming fewer or more separate members, omitting the moving member 36f to have the spring 36g and/or shaft 36i directly engage the locking rail 34, having the slot 36c formed as a recess and not extend axially entirely through the stationary members 36a, 36b, etc.

The template support 20 is configured to properly position each template member 40 in a set of template members 40 at a predefined axial location along the template support 20. Each template member is thereby coupleable (e.g., securable or lockable) to the template support 20 with the locking rail 34 at only one of the predefined or predetermined locations. More particularly, and as referenced above, the template support 20 includes the locating plate 30 (e.g., locating panel) having the slot 30a configured to receive the locating member 48 of each template member 40 to uniquely locate each template member 40 axially along the template support 20. The locating plate 30 is a generally planar member, which forms a generally planar upper surface of the template support 20. The locating slot 30a opens upwardly from an upper most surface 30d of the locating plate 30 and may extend entirely through the locating plate 30 to expose the upper side 22d of the structural member 22 thereunder, or may be a detent or recess extending only partially into the locating plate 30. The locating slot 30a extends straight at a constant, non-zero angle (e.g., between approximately 10 and 20 degrees) relative to the axial direction. The locating slot 30a is generally defined by two interior parallel walls of the locating plate 30, which extend straight in a linear fashion at the constant angle. By extending straight in a linear fashion, the locating slot 30a provides infinite variability in the axial positions (e.g., the number of different spaced-apart axial positions) at which each template member 40 may have its predefined position along the template support 20. For example, the locating slot 30a extends axially along the upper side 22d of the structural member 22 from proximate the first end 22a toward the second end 22b and transversely across the structural member 22 from proximate the first side 22e toward the second side 22g. As will be discussed in further detail below, the locating member 48 of each template member 40 has a unique transverse position along the lower surface 46a thereof as compared to each other template member 40 (e.g., relative to the recesses 42a and/or 44a discussed below), which may be received in the locating slot 30a at only one axial location along the template support 20.

The locating plate 30 is coupled to the upper side 22d of the structural member 22, for example, using threaded fasteners 30b. The locating plate 30 may, for example, be made of steel, which may provide greater durability than softer materials (e.g., aluminum or nylon), as different sets of template members 40 are repeatedly coupled to and removed from the template support 20. Alternatively, the locating plate may be configured differently, for example, by being provided as multiple pieces, being omitted with the locating slot 30a being formed in the upper side 22d of the structural member 22, and/or being made of a different material.

With reference to FIGS. 2, 4B-4D, and 6A-6B, each template member 40 is configured to support a workpiece 1 positioned thereon and removably couple to the template support 20. Each template member 40 is a generally planar member (e.g., having two planar faces or planar axial faces) with an upper edge or surface 40a that is contoured (e.g., uniquely contoured) to complementarily and matingly engage an underside surface of the workpiece 1, as was described in the Background for the gauge slice templates. The upper surface 40a may have a three-dimensional contour, so as to vary in height moving both transversely and axially, which results in the template member 40 having a varied cross-sectional shape moving in the axial direction. The upper surface 40a may alternatively have a two-dimensional contour, so as to vary in height moving transversely but not axially, which allows the template member 40 to have a constant cross-sectional shape moving in the axial direction. This constant cross-sectional or two-dimensional shape may advantageously be formed with simple machining tools (e.g., a two-dimensional CNC router or sheet cutting apparatus), whereas forming a three-dimensional contour may require additional manufacturing operations and/or more complex or more expensive tooling and equipment. The upper edge 40a may, as shown, extend transversely outward past the first side 22e and the second side 22g of the structural member 22, as well as the fixed rail 24 and the locking rail 34, to provide a broad surface for supporting the workpiece 1 thereon.

As referenced above, each template member 40 includes the first portion 42 configured to engage the fixed rail 24, the second portion 44 configured to engage the locking rail 34, a third portion 46 configured to engage the secondary fixed rail 32, and the locating member 48 (e.g., key or male member or protrusion) configured to be received in the locating slot 30a of the locating plate 30.

The first portion 42 of the template member 40 includes a first recess 42a (e.g., slot, aperture, etc.) configured to receive the fixed rail 24 therein in a transverse direction. The first slot 42a is generally C-shaped and extends entirely through the template member 40 in an axial direction and includes an opening 42b facing transversely inward and downward. The first slot 42a includes a transverse outer end 42c whose inner periphery has a curved or circular profile complementary to the fixed rail 24 to receive the fixed rail 24 therein, rotate about the fixed rail 24, and prevent upward or downward movement of the first portion 42 of the template member 40. The outer end 42c extends circumferentially approximately 180 degrees about an axis of its curved profile from a lower end 42d to an upper end 42e of the recess 42a. The upper end 42e extends transversely (e.g., in a generally horizontal direction) to an inner end 42f that extends downward. The opening 42b extends between the lower end 42d and the inner end 42f of the slot 42a.

The second portion 44 of the template member 40 is positioned opposite the first portion 42 (i.e., relative to the template support 20 when positioned thereon) and additionally extends downward to a lower elevation, so as to engage the locking rail 34 that is positioned at a lower elevation than the fixed rail 24. The second portion 44 includes a second recess 44a (e.g., detent, slot, aperture, etc.) configured to receive the locking rail 34 therein in a transverse direction, so as to couple or secure the template member 40 to the template support 20. The second slot 44a is generally C-shaped and extends entirely through the template member 40 in an axial direction and includes an opening 44b facing transversely inward. The second slot 44a includes a transverse outer end 42c whose inner periphery has a curved or circular profile complementary to the locking rail 34 to mate therewith, for example, by hooking around the locking rail 34. In particular, the outer end 44c of the second slot 44a extends circumferentially about its own central axis past an imaginary line extending between its central axis and the central axis of the outer end 42c of the first slots 42a. As such, the outer end 44c extends around and engages the locking rail 34 to prevent pivoting of the template member 40 upward about the fixed rail 24.

The template member 40 is configured relative to the fixed rail 24 and the locking rail 34 to have an interference fit therewith. In particular, a first maximum distance between the curved surfaces of the first slot 42a and the second slot 44a of the template member 40 is nominally slightly less than a corresponding second maximum distance between outer surfaces of the fixed rail 24 and the locking rail 34 of the template support 20 when in the locked position. For example, the first maximum distance of the template member 40 may be measured passing through the central axes of the outer end 42c of the first slot 42a and the outer end 44c of the second slot 44a, while the corresponding second maximum distance of the template support 20 may be measured passing through the central axes of the fixed rail 24 and the locking rail 34. As a result of the smaller nominal first distance, when the template member 40 is secured to the template support 20, the fixed rail 24 and the locking rail 34 are compressed inwardly by the template member 40. The difference between the first maximum distance and the corresponding second maximum distance may, for example, be 0.0020 inches.

Figure 6A:
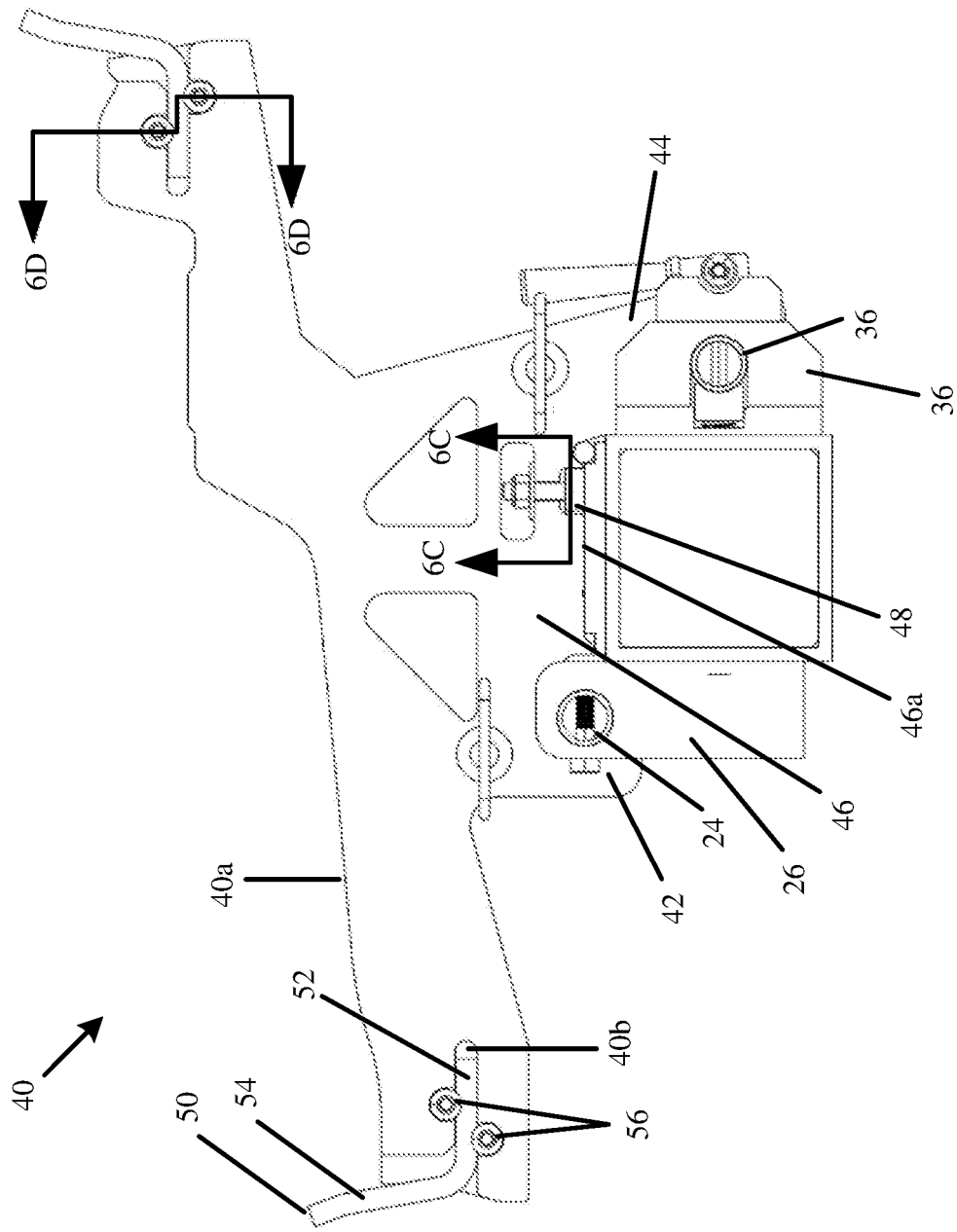
FIG. 6A is an end view of the manufacturing system shown in FIG. 1.
Figure 6B:
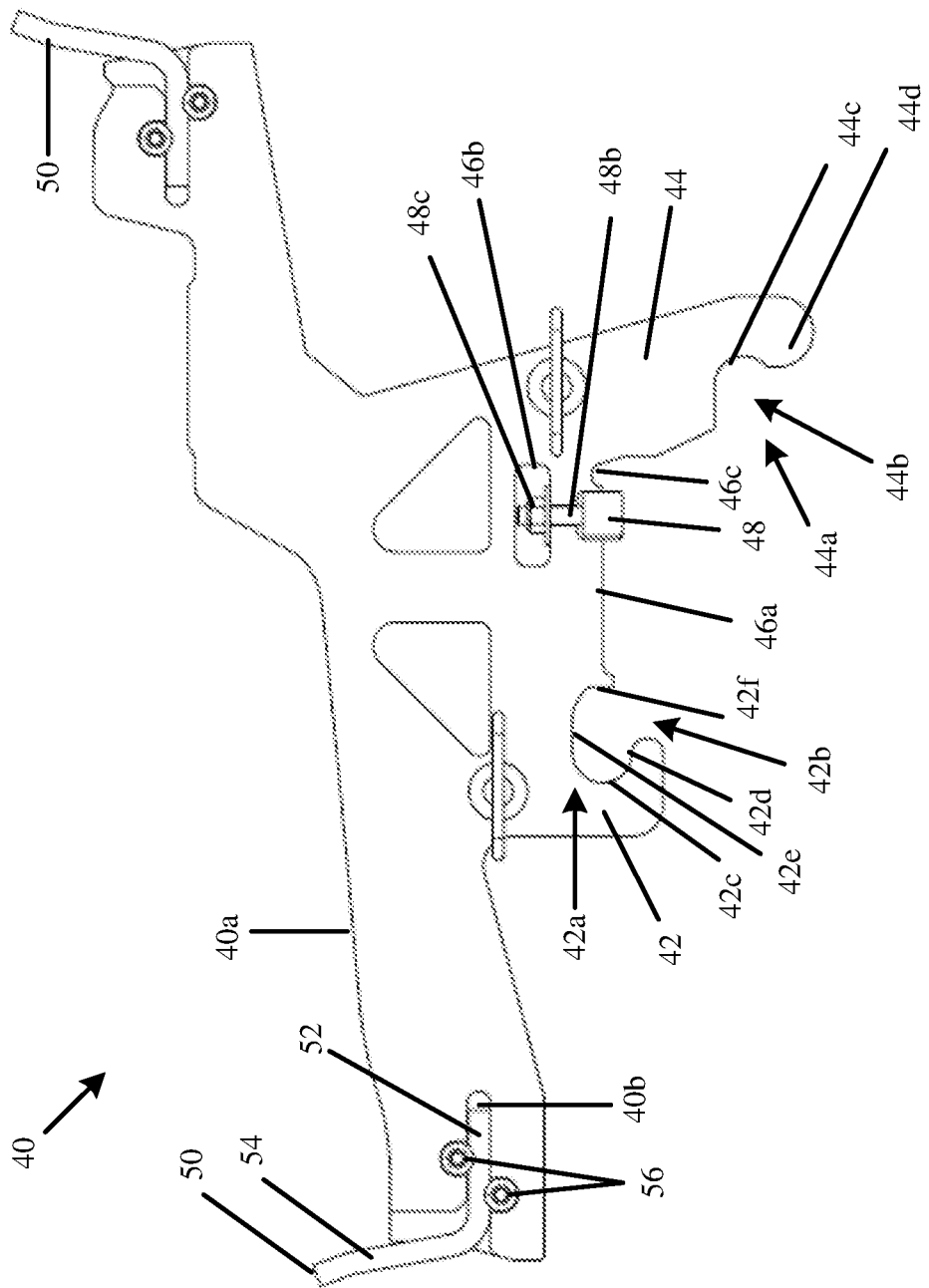
FIG. 6B is an end view of a template member of the manufacturing system shown in FIG. 1.

As referenced above, the template member 40 is additionally configured relative to the fixed rail 24 and the locking rail 34 to bias the locking rail 34 inward as the template member 40 is rotated about the fixed rail 24 into its secured position. As shown in FIG. 6B, along with FIGS. 4B-4D, the second portion 44 of the template member 40 includes a surface 44d below the slot 44a, which engages the locking rail 34. The surface 44d extends radially outward relative to the axis of the outer portion 44c of the slot 44a. As the template member 40 is rotated from an upper position (see FIG. 4D) downward, the surface 44d engages and applies an inward force against the locking rail 34 (see FIG. 4C) that overcomes the force of the spring 36g to move the locking rail inward toward the structural member 22. As the template member 40 continues to be rotated, the locking rail 34 moves inward slides along the surface 44d until reaching the slot 44a, at which point the spring 36g biases the locking rail 34 back outward into the slot 44a into the locking position (see FIG. 4B). In this manner, template member 40 is configured to snap or latch over the locking rail 34.

The third portion 46 of the template member 40 extends transversely between the first portion 42 and the second portion 44 and is configured to engage the locating plate 30. The third portion 46 includes a lower surface or edge 46a that is generally planar (e.g., extending transversely or horizontally) and rests on the uppermost surface 30d of the locking plate 30. The lower surface 46a is positioned at an elevation approximately equal to that of the central axis of the outer portion 42c of the slot 42a, which as referenced above, facilitates receipt of the locating member 48 in the locating slot 30a of the locating plate 30. Stated differently the plane or a line defined by the lower surface 46a intersects or nearly intersects the central axis of the slot 42a and, thereby, the fixed rail 24. According to other exemplary embodiments, the lower surface 46a may be positioned at an elevation approximately equal to any portion of the slot 42a, such that the plane or line defined by the lower surface 46a intersects any portion of the slot 42a and, thereby, the fixed rail 24. According to still other embodiments, the lower surface 46a may be positioned above or below the aforementioned locations, and may be configured to engage the upper side 22d of the structural member 22.

As referenced above, positioning of the locking rail 34 below the uppermost surface 30d of the locating plate 30 aids in maintaining the template member 40 in an upright orientation relative to the template support 20. In particular, with the lower surface 46a of the template member 40 resting on the uppermost surface 30d of the locating plate 30, the interface therebetween forms an axis about which the template member 40 may pivot. For example, a tangential force relative to this pivot axis may be caused by a workpiece 1 received on the template member 40, which would create a moment about this axis. To maintain the template member 40 in an upright orientation relative to the locating plate 30, this moment must be counteracted. By positioning the locking rail 34 lower than this pivot axis and coupling the template member 40 to the locking rail 34 at this lower location, a moment arm is increased to thereby lessen the amount of local force required of the template member 40 to counteract the moment created by the tangential force. This increased moment arm has the additional effect of increasing the torsional rigidity and stiffening the connection formed between template member 40 and the template support 20.

As also reference above, the locating member 48 is coupled to the third portion 46 and protrudes below the lower surface 46a to be received within the locating slot 30a of the locating plate 30. The locating member 48 of each template member 40 has a unique transverse (e.g., lateral) position along the lower surface 46a (e.g., relative to the first slot 42a and the second slot 44a, or other commonly located features of each template member 40) as compared to those of each other template member 40 in a given set. A set of template members 40 is a grouping of template members 40 configured to cooperatively support a workpiece 1 of a particular design. In cooperation with the configuration of the locating slot 30a (i.e., being straight and angled/tapered at a non-zero angle relative to the fixed rail 24 or axial direction), each template member 40 of a single set has only one axial position (i.e., a predetermined or desired position) along the template support 20 in which both the locating member 48 is receivable within the locating slot 30a and the template support 20 is coupleable (e.g., securable or lockable) to the template support 20 with the locking rail 34 (e.g., being received in the second recess 44a). Thus, the template members 40 are coupleable with the locking rail 34 to the template support 20 at different axial positions. At any other position, the locating member 48 of a given template member 40 is not receivable within the locating slot 30a and instead engages the uppermost surface 30d of the locating plate 30, which prevents the first portion 42 from pivoting downward far enough to be engaged and secured by the locking rail 34. For example, without receipt of the locating member 48 within the locating slot 30a, the outer end 44c of the second slot 44a cannot extend or hook around the locking rail 34 to fixedly secure the template member 40 to the template support 20.

Figure 6C:
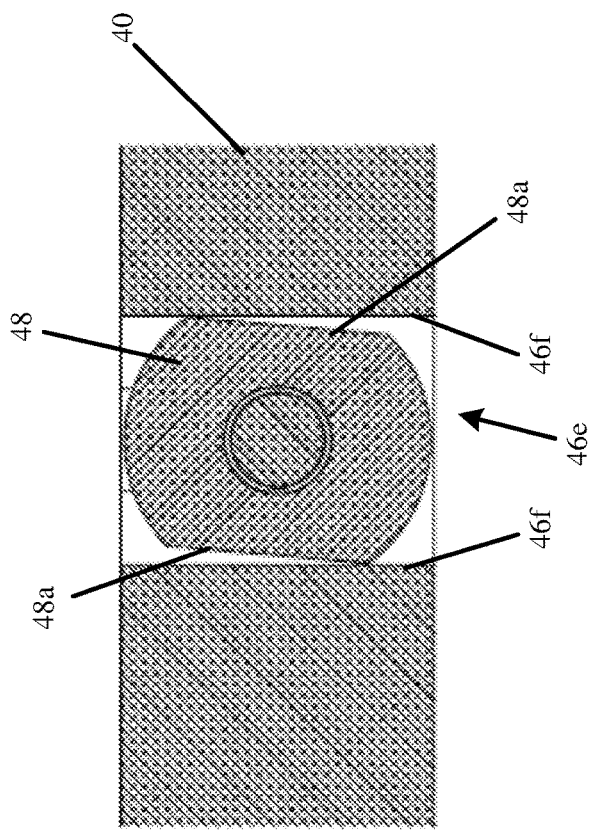
FIG. 6C is a cross-sectional view of the manufacturing system taken along line 6C-6C in FIG. 6A.

As shown in FIG. 6C, the locating member 48 includes two parallel, planar faces 48a that are spaced apart a distance slightly less than the width of the locating slot 30a. The parallel faces 48a are arranged at the same angle relative to the axial direction as is the slot 30a (e.g., 15 degrees), so as to engage with tight tolerances the parallel walls in the locating plate 30 that define the slot 30a. The locating member 48 is coupled to the template member 40 with a threaded shaft 48b that extends into a cutout or aperture 46b. A nut 48c is positioned in the aperture 46b and receives therein the threaded shaft 48b to thereby couple the locating member 48 to the template member 40. The locating member 48 may also be positioned within a recess or channel 46e that extends in an axial direction through the template member 40. The walls 46f of the channel 46e may extend perpendicular to the axially facing surface of the template member 40, while the locating member 48 is rotationally positioned within the channel 46e with the parallel faces 48a engaging the walls of the channel 46e. For example, the channel 46e and the locating member 48 may be configured to rotationally orient the locating member 48, such that the parallel faces 48a engage the walls 46f of the channel 46e when the locating member 48 is properly oriented.

While an alternative locating member 48 could be formed integrally with the template member 40, due to the angular relationship of the parallel surfaces 48a relative to the axial faces of the template member 40, manufacturing advantages are provided with the locating member 48 being as a separate member that is coupled to the template member 40. In particular, with exception to those template members 40 having a three-dimensional profile of the upper surface 40a, the other features described herein of the template member 40 (e.g., first slot 42a, second slot 44a, lower surface 46a, etc.) may be two-dimensional, which provides the template member 40 with a constant cross-sectional shape (e.g., substantially constant outer peripheral shape) moving axially through the template member 40. As described above, this two-dimensional shape may be formed with simple machining tools and process. An integrally formed locating member 48, though possible, would instead require a three-dimensional (i.e., having different cross-sectional shapes moving axially through the template member 40) and require additional operations and/or more complex tooling to form the parallel surfaces 48a with their proper angular orientation relative to the axial faces of the template member 40.

According to other embodiments, the locating member 48 may have a different shape, for example, a cylindrical shape but would engage the locating slot 30a over a smaller surface area (e.g., line contact) and may not provide as tight of tolerances as the surface contact of the parallel surfaces 48a.

The template member 40 may additionally include one or more gages (e.g., guide or receiving members) coupled to the template member 40, which engage edges of the workpiece 1 to guide each workpiece 1 into proper position on the template members 40. For example, the gages can laterally guide a workpiece 1 into position if the workpiece is dropped from above the template members 40 rather than being placed directly on the template members 40), and the gages may prevent unintended dislodging of the workpiece 1 from the template members 40.

Figure 6D:
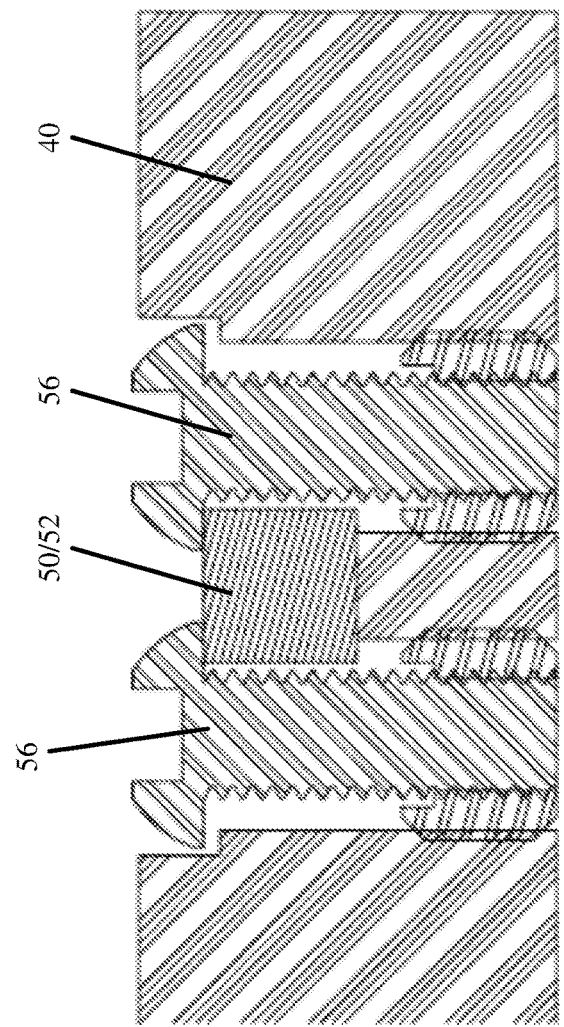
FIG. 6D is a cross-sectional view of the manufacturing system taken along line 6D-6D in FIG. 6A.
Figure 7:
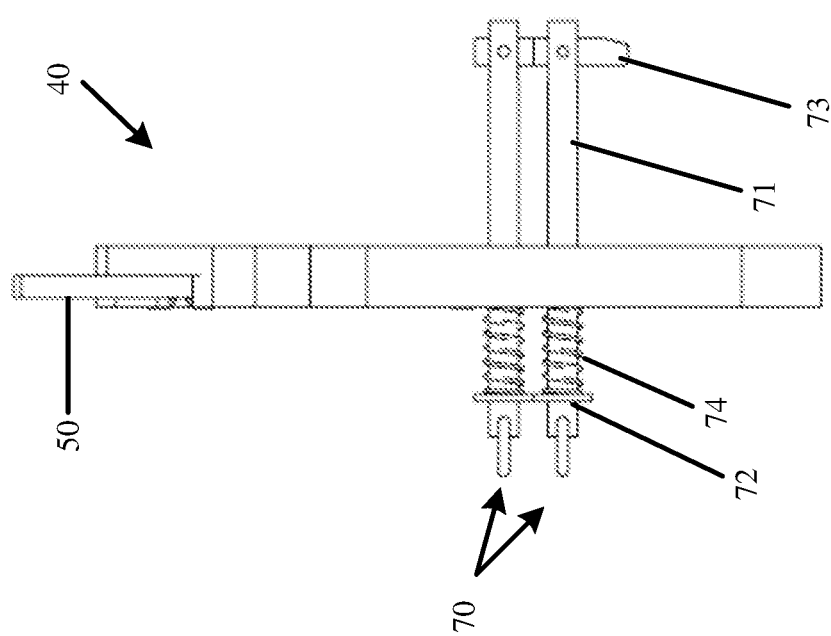
FIG. 7 is a side view of the template member shown in FIG. 6.

With reference to FIGS. 6-7 (see also FIGS. 1-2 and 8-9), according to a first embodiment, a gage 50 is a unitary member having a first segment 52 (e.g., first leg, arm, etc.) coupled to the template member 40, and a second segment 54 extending upward from the first segment 52. The second segment 54 extends above the upper surface 40a of the template member 40, while extending, flaring, or bending transversely outward so as to engage edges of the workpiece 1 to receive and guide or locate a workpiece 1 in a transverse direction. The first segment 52 is extends straight into a slot 40b in the template member 40, which extends transversely into the template member 40 below the contoured upper surface 40a of the template member 40. The slot 40b may, for example, be machined into an axial face of the template member 40 but does not extend entirely axially therethrough.

The gage 50 is adjustably coupled to the template member 40 with two threaded fasteners 56 that are, respectively, positioned above and below the first segment 52 of the gage 50. The fasteners 56 are received axially within apertures (not labeled) of the template member 40. The heads of the fasteners 56 engage axially facing surfaces of the first segment 52 to compress the first segment 52 axially between the heads of the fasteners 56 and the template member to frictionally retain the first segment 52 in the slot 40b. The transverse location of the gage 50 may be adjusted by loosening the fasteners 56, sliding the first segment 52 within the slot 40b, and retightening the fasteners 56.

The gages 50 are additionally configured to allow adjacent template members 40 to engage each other across opposed axially facing surfaces thereof. This allows for the template members 40 of a given set to be stored in a compact manner. More specifically, the gages 50 do not extend axially outside a region between two planes of the two opposite axially facing surfaces of the template members 40. Additionally, as shown in FIG. 6D, the heads of the fasteners 56 are received within corresponding recesses in the axially facing surface of the template members 40, such that the heads do not extend axially from the axially facing surface of the template member 40.

Gages 50' (see FIGS. 2 and 8) are a variation of the first embodiment of the gage 50. First segments (not labeled) of the gages 50' are configured and coupled to the template member 40 in the manner described for the first segment 52 of the gage 50 described above. However, second segments (not labeled) of the gage 50' extend, flare, or bend in an axial direction, so as to receive and guide or locate a template member in an axial direction. As with the gages 50 and fasteners 56, the gages 50' and their associated fasteners do not extend axially outside the region defined between planes of the two axially facing surfaces of the template members 40.

Figure 11:
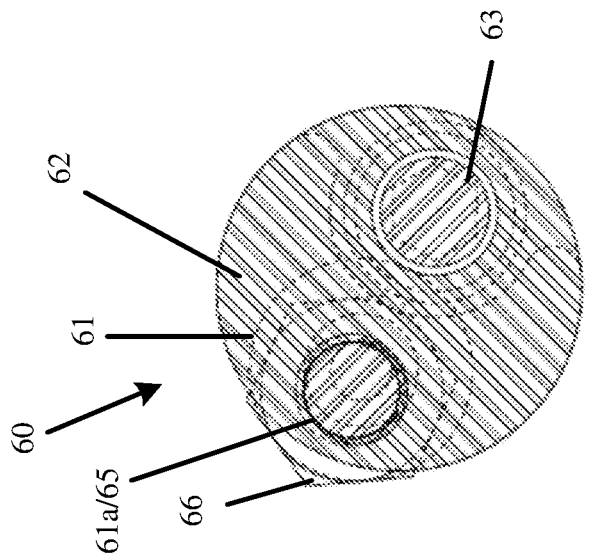
FIG. 11 is a cross-sectional view taken along line 11-11 in FIG. 10.
Figure 10:
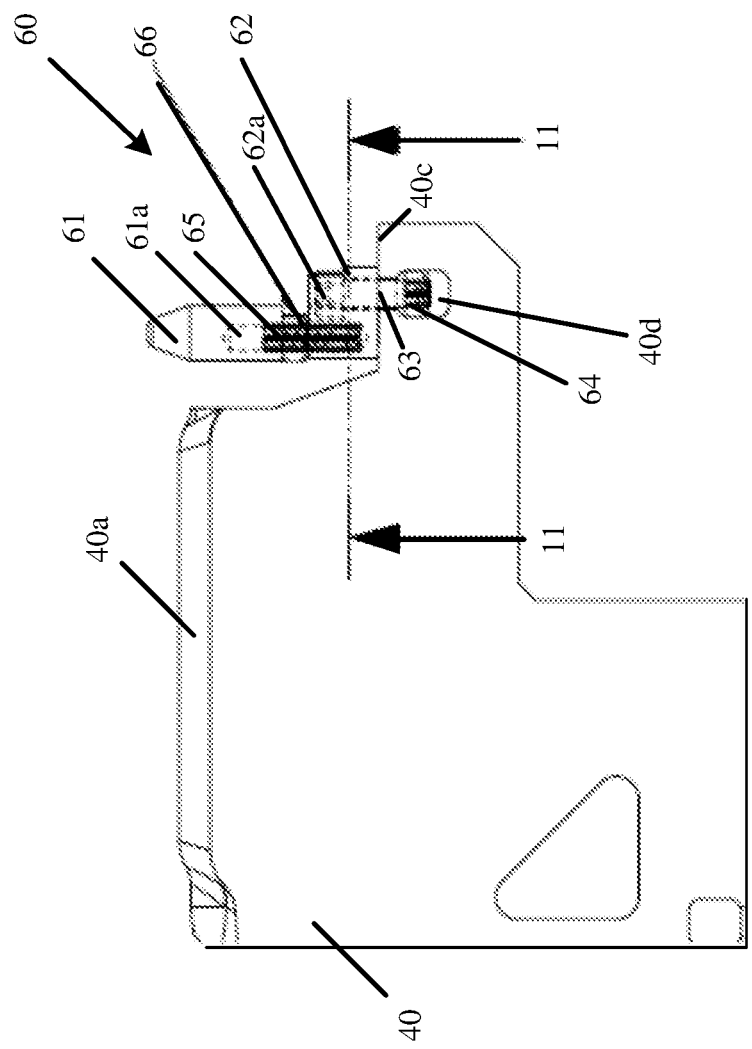
FIG. 10 is an end view of the template member a second embodiment of a gage.
Figure 13A:
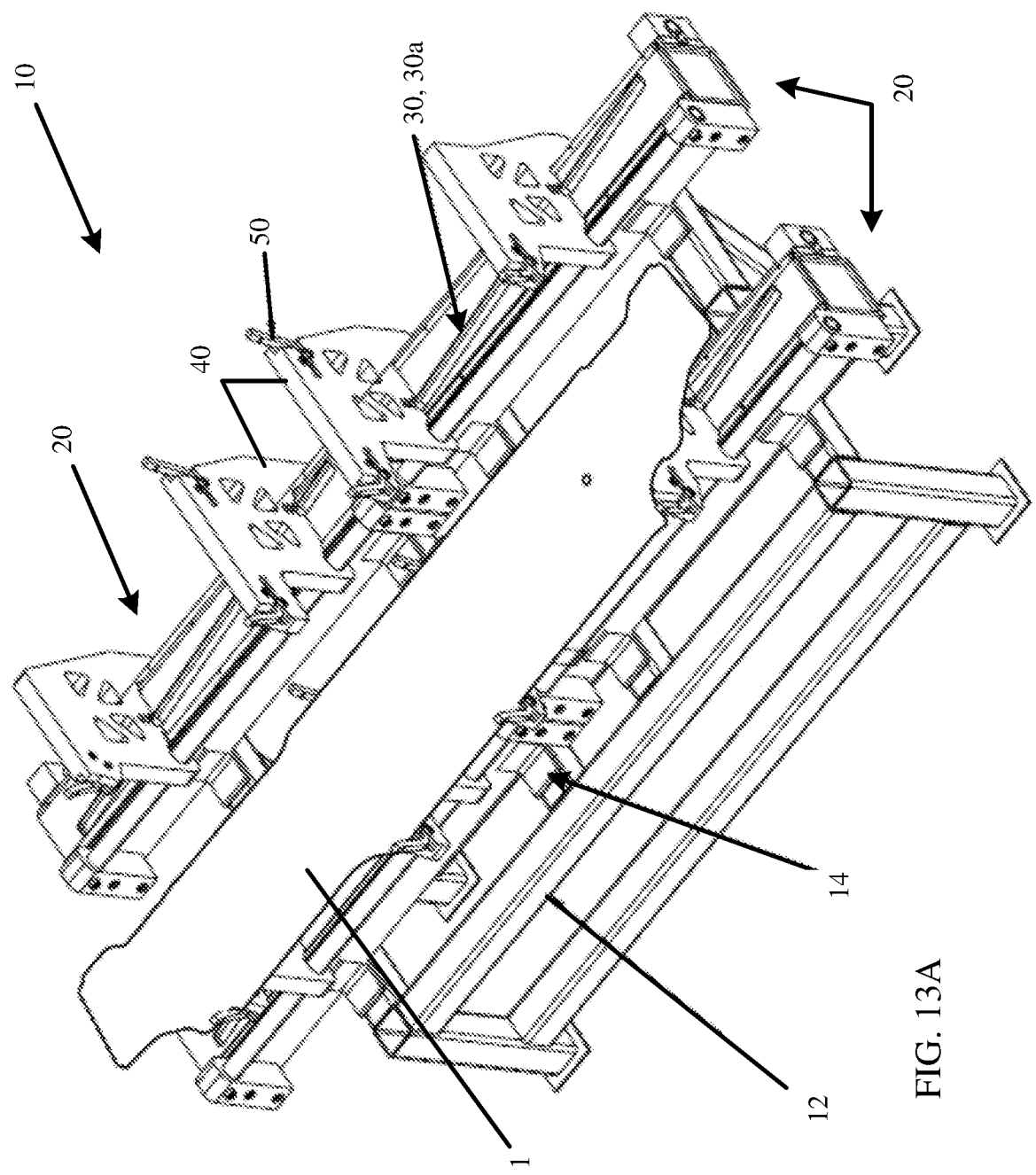
FIG. 13A is an end view of a manufacturing system according to an exemplary embodiment, which comprises multiple template supports and multiple sets of template members.
Figure 13B:
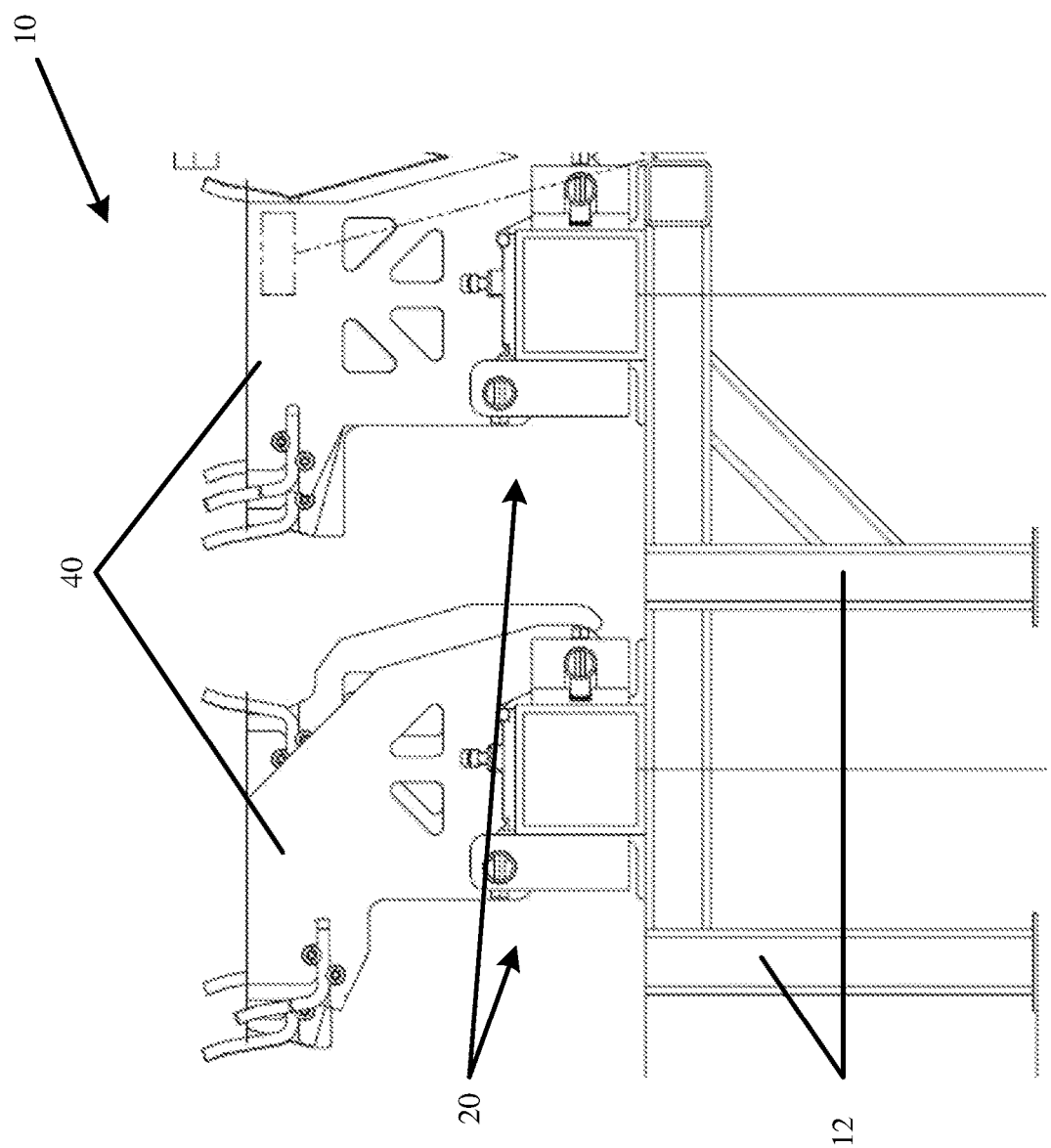
FIG. 13B is a perspective view of a manufacturing system, which includes multiple template supports and multiple sets of template members that are supporting a workpiece, and additional tooling.

With reference to FIGS. 10-11, according to a second embodiment, a gage 60 is configured as an offset pin assembly. The gage 60 generally includes a pin 61 coupled to a body 62, which is in turn coupled to the template member 40. The gage 60 is positioned on the template member 40 at a position corresponding to a locating aperture in the workpiece 1. As shown in the end view of FIG. 10, the gage 60 is located outward of the contoured surface 40a of the template member 40 but may instead be positioned at an inward location corresponding to a locating aperture of the workpiece 1. As discussed in further detail below, off-axis fasteners of the pin 61 and the body 62, which allow for location adjustment of the pin 61 relative to the template member 40. Alternatively the pin 61 and/or the body 62 may be coupled in a non-adjustable manner, or the pin 61 may be coupled directly to the template member 40 without the body 62 positioned intermediately therebetween.

The body 62 is a generally cylindrical member having a lower surface that engages a lower, upward facing surface 40c of the template member 40. The lower surface 40c is at an elevation below the contoured surface 40a adjacent thereto, which allows the pin 61 to extend above the contoured surface 40a to engage the workpiece 1. The body 62 remains below the contoured surface 40a so as to not engage or interfere with the workpiece 1. The body 62 is coupled to the template member 40 with an elongated, threaded fastener 63 that extends downward from the lower surface of the body 62. The fastener 63 extends from an aperture 62a of the body 62, which is offset from a central axis of the body 62. The fastener 63 extends downward into a slot 40d of the template member to engage a nut 64 therein, which compress therebetween a portion of the template member 40 defining the slot 40d to couple the body 62 to the template member 40.

The pin 61 extends upward from the upper surface of the body 62 offset from the central axis of the body 62. The pin 61 is coupled to the body with an elongated threaded fastener 65 that extends upward from the body 62 at a different off-axis location than does the fastener 63. The fastener 65 additionally extends into a threaded aperture 61a of the pin 61, which is offset from a central vertical axis of the pin 61. A jam nut 66 on the fastener 65 engages the pin 61 to fix the pin 61 into a rotational position on the fastener 65.

To adjust the position of the pin 61 relative to the template member 40, the fastener 63 may be moved in an axial direction (i.e., relative to the template support 20) within the slot 40d, and the body 62 may be rotated about the fastener 63. Because of the off-axis location of the fasteners 63 and 65 relative to the body 62, this movement cooperatively provides limited axial and transverse location adjustment of the pin 61 relative to the template member 40. Further, the pin 61 may be rotated about the fastener 65, which due to the off-axis location of the fastener 65 relative to the pin 61, provides further limited axial and transverse location adjustment of the pin 61 relative to the body 62 and ultimately the template support member 40.

As with the gages 50 and 50', the gage may be configured to not extend outside a region between planes defined by the two opposite axial surfaces of the template member 40. To this end, the diameters of the pin 61 and the body 62 are less than a thickness of the template member 40 between the two opposite axial surfaces. The gage 60 depicted in FIG. 10, whose body 62 is depicted as extending outside the region between the planes of the axial surfaces but may be adjusted to be within the region.

Figure 8:
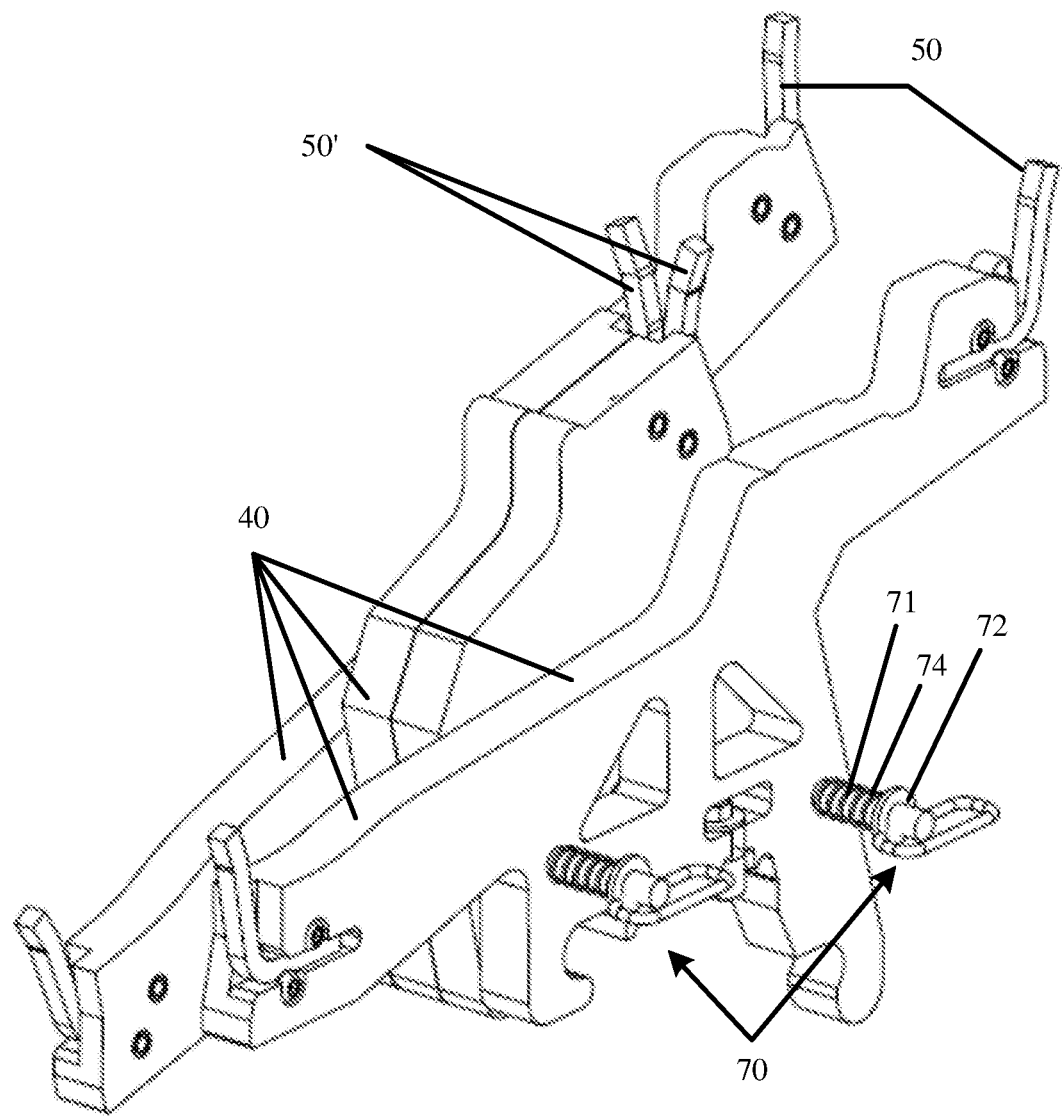
FIG. 8 is a perspective view of a set of template members of the manufacturing system shown in FIG. 1.

With reference to FIGS. 7-9, each template member 40 is configured to be coupled to other template members 40 of a set of template members 40 (i.e., those template members 40 cooperatively configured to support workpiece 1 of a particular design). More particularly, the template members of a set are configured to couple to each other with one planar face of each template member contacting (e.g., abutting) one of the planar faces of another template member 40 adjacent thereto. Each template member 40 includes two apertures 40*k* (labeled in FIG. 4B) extending axially through the template member 40. Two pins 70 are inserted through the apertures 40*k*, so as to hold and couple the template members 40 adjacent to each other. Each pin includes an elongated shaft 71 having a flange 72 (e.g., head) at one end, a toggle 73 pivotally attached at another end, and a spring 74 positioned on the shaft 71. To insert the pin 70 into the aperture 40*k*, the toggle 73 is pivoted, so as to be aligned with the shaft 71 thereby allowing insertion through the corresponding apertures 40*k* of the template members 40. The shaft 71 is inserted a sufficient distance to compress the spring 74 between a first of the template members 40 and the flange 72 and to pivot the toggle 73 to be generally perpendicular to the shaft 71. A last of the template members 40 is then moved against the toggle 73, and the spring 74 is relaxed or decompressed slightly to compress and hold the template members 40 of the set together on the two pins 70.

According to one embodiment, the template members 40 are configured to receive the two pins 70 while only one template member 40 remains in its predetermined position on the template support 20. For example, each other template member 40 may be moved axially along the fixed rail 24 to engage each adjacent template member 40. In this manner, the template support 20 facilitates coupling together and removal of the set of template members 40 as a unit.

More particularly, the apertures 40*k* of the template members 40 are positioned so as to receive the two pins 70 while one template member 40 (e.g., on an end) remains in its predetermined position with its locating member 48 positioned in the slot 30*a* of the locating plate 30. The remaining template members 40 are rotated slightly upward about the fixed rail 24 with their locating members 48 resting on the upper surface 30*d* of the locating plate 30. While in this configuration, the apertures 40*k* of all template members 40 are aligned allowing insertion of the pin 70 therein. Because the other template members 40 are rotated to a higher position than the end template member 40, the aperture 40*k* of the end template member 40 is positioned higher in relation to commonly located features (e.g., first slot 42*a* and second slot 44*a*) than are the apertures 40*k* of the other template members 40. The apertures 40*k* of the other template members 40 may, for example, be at a common location, or have slight height variation therebetween based on the different positions of the locating members 48 causing slight variation in the rotational position of the template members 40.

Figure 17:
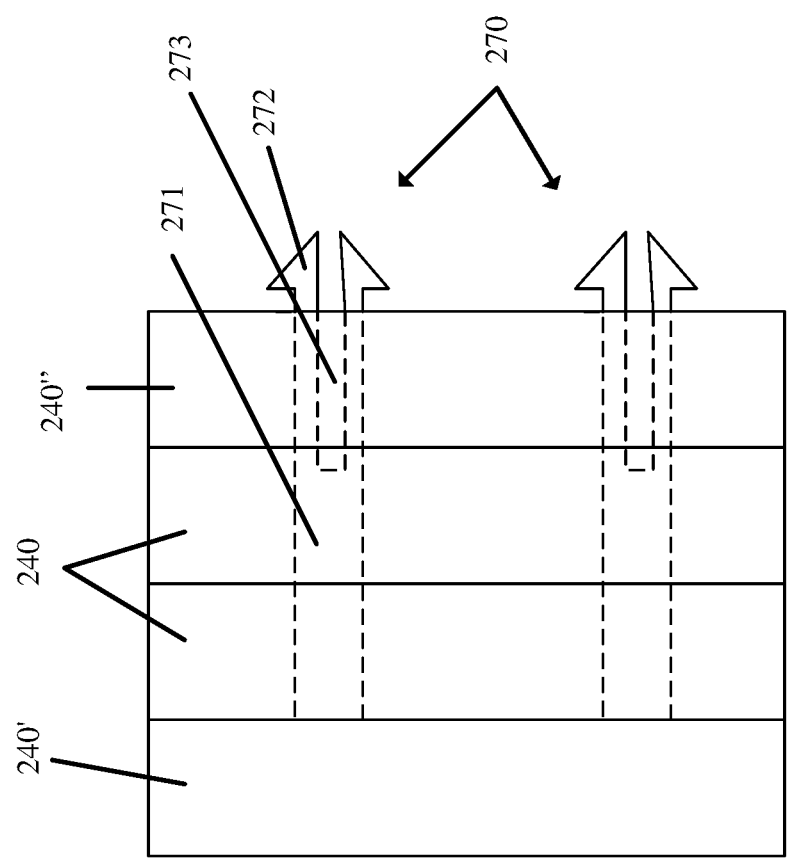
FIG. 17 is a top view of a set of template members coupled to each other.

With reference to FIG. 17, according to another exemplary embodiment, an outermost or end template member 240' includes a plurality (e.g., two) pins 270 fixed thereto, which are receivable in the remaining template members 240, 240" of the set. The pins 270 are coupled to an axial face of the outermost template member 240' and extend axially therefrom (e.g., at a perpendicular angle relative to the axial face) toward each of the other template members 240, 240" of the set. The pins 270 are insertable through apertures (not labeled) of the remaining template members 240, 240". The pins 270 include a head 272 with a barb or shoulder that has a larger cross-sectional dimension than do the apertures of the template members 240, 240", which engages an axial surface of an opposite end template member 240" to retain the template members 240, 240" on the shaft 271 (shown in phantom) of the pins 270 between the first end template member 270' and the head 272. To facilitate receipt of the head 272 and shaft 271 in and through the apertures of the template members 240, 240", the pin 270 is bifurcated having a slot 273 extending through the head 272 and at least partly through the shaft 271. The slot 273 allows the head 272 to compress radially inward sufficiently for the head 272 to pass through the apertures and expand back radially outwardly for the head 272 to retain the template members 240, 240". The pins 270 may, for example, be made from an elastically resilient material (e.g., plastic, sprung metal). To insert the pins 270 into the apertures of each other template member 240, 240", the template member 240' may be slid along the template support to insert the pin 270 successively into each other template member 240, 240" while in their predetermined positions (i.e., with their locating members in the locating slot; refer to locating member 48 and locating slot 30*a*). For example, the pins 270 to be coupled to the end template member 240' at a lower positions than the apertures of the remaining template members 240, 240" relative to fixed features (e.g., refer to the first slot 42*a* and the second slot 44*a* above), such that when slid axially forward with its locating member (refer to locating member 48*a*) sliding across the locating plate (refer to locating plate 30), the pins 270 are at the same elevation as the apertures of the other template members 240, 240". Alternatively, the pins 270 may be coupled to the end template member 240' at a lower elevation, allowing the other the template members 240, 240" to be slid onto the pines 270 while the end template member 240 is in its predetermined position, or the pins 270 and apertures may have the same relative location.

According to some embodiments a manufacturing system 10 may individually, or multiple manufacturing systems 10 may cooperatively, include multiple template supports 20 and multiple sets of template members 40 that are configured to engage workpieces 1 having a single design. In such circumstances, each template support 20 may additionally be configured such that only one such set of template members 40 (i.e., an associated set of template members 40) is capable of being securely coupled that particular template support 20. In particular, with reference to FIGS. 4, 5, 6B, and 12A-12C, the template support 20 and its associated set of template members 40 include cooperative mating features (e.g., mechanical code features, such as male/female, or positive/negative features). For example, and as shown in the figures, the template support 20 includes a mechanical coding rail 32 (e.g., a second fixed rail or member), which is cooperatively configured to mate with a corresponding coding recess 46c in the third or intermediate portion 46 (e.g., segment or region) of each template member 40. The coding recess 46c has a cross-sectional profile substantially matching that of the coding rail 32 (e.g., common shape and size). The coding member 32 is a generally rigid, elongated member that extends axially (i.e., parallel with an axis of the fixed rail 24) and has a constant cross-section. This allows each template member 40 to have a corresponding coding recess 46c configured the same (i.e., in position and shape) to the other template members 40 of the same set. The coding rail 32 may, for example, be a tubular or solid member having a circular cross-section, as shown, while the coding recess 46c has a complementary partially circular profile. As discussed in further detail below, the coding rail 32 and corresponding coding recess 46c may have other coded shapes that allow coupling of associated template members 40 but prevent secure coupling of template members 40 not associated with a particular template support 20.

With reference to the specific examples discussed below, the coding rail 32 and coding recesses 46c may be configured in both position and shape to prevent secured coupling of template members 40 to a template support 20 not associated therewith. For example, the coding rail 32 may be positioned either on a first side of the locating slot 30a adjacent the first side 22e of the structural member 22, or on a second side of the locating slot 30a adjacent the second side 22g of the structural member 22 (as shown). By providing two different mounting locations, a single shape may provide two different mechanical codes. The shape of the coding rail 32 and coding recesses 46c may, for example, be circular, square, and/or rectangular, while allowing mating therebetween as the template members 40 are rotated about the fixed rail 24. If multiple shapes are used, each coding rail 32 must engage edges or surfaces of the coding recesses 46c for unassociated sets of template members 40 to prevent the template members 40 rotating to a securable position.

As shown schematically in FIG. 12A, for a first template support 20 (see also FIG. 5) and its associated set of template members 40 (see also FIG. 6B), the coding rail 32 is coupled to the locating plate 30 at a first outward position (e.g., outwardly of the slot 30a adjacent the locking rail 34 and the second side 22g of the structural member 22). The coding rail 32 protrudes upwardly above the upper surface 30d of the locating plate 30 to be received within the recesses 46c of all template members 40 in the set. For example, the coding rail 32 may be coupled to (e.g., using fasteners 32a) and positioned on a shelf 30c having an upward facing surface that is lower than the upper surface 30d of the locating plate 30.

As shown schematically in FIG. 12B, a second template support 20' and its associated set of template members 40' may be configured identically to the first template support 20 and the first set of template members 40 except for the locations of the coding member 32' on the template support 20' and corresponding coding recesses 46c' on the template members 40'. Instead of being located at the first outward position (see FIG. 13A), the coding rail 32' is positioned at a second outward position opposite the first position relative to the locating plate 30. By having the coding rails 32 and 32' and the coding recesses 46c and 46c' in opposite locations, though having the same cross-sectional profiles, the template members 40 of the first set are only coupleable to the first template support 20 and those template members 40' of the second set are only coupleable to the second template support 20'.

As shown schematically in FIG. 12C, a third template support 20" and its associated third set of template members 40" may be configured identically to the first template support 20 and the first template members 40 except for the cross-sectional profile of the coding rail 32 and mating coding recesses 46c. For example, instead of having a circular cross-sectional profile, the coding rail 32" and coding recesses 46c" may have a substantially square cross-sectional profile. The square coding rail 32" of the third template support 20" would be receivable in complementary coding recesses 46c" of the template members 40" in the third set. However, the square coding rail 32" would be sized relative to the circular coding recesses 46c of the template members 40 of the first set, such that upper edges of the square coding rail 32" would engage the inner surface of the circular coding recesses 46c and prevent receipt of the square coding rail 32" therein and, thereby, prevent securable receipt of the first set of template members 40 on the third template support 20". Similarly, the circular coding rail 32 of the first template support 20 would engage edges of the square coding recesses 46c" to prevent receipt of the circular coding rail 32 therein and, thereby, prevent securable receipt of the third set of template members 40" on the first template support 20. With respect to the second template support 20' and second set of template members 40', the opposite locations of the coding rails 32' and 32" and the coding recesses 46c' and 46c" would prevent coupling of template members 40' and 40" on the unassociated template supports 40" and 40', respectively, as discussed above.

Figure 14:
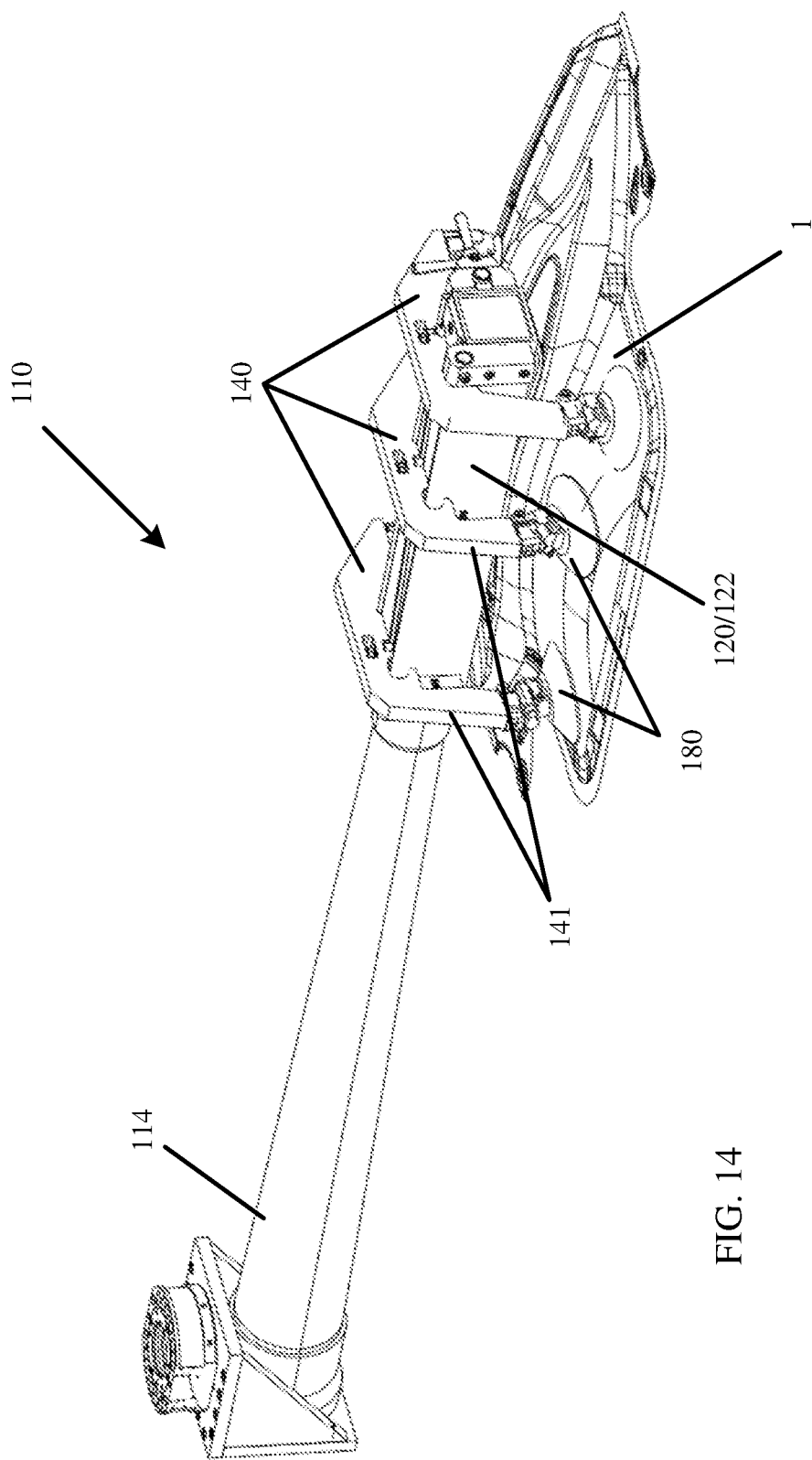
FIG. 14 is a perspective view of a manufacturing system according to another embodiment.
Figure 15:
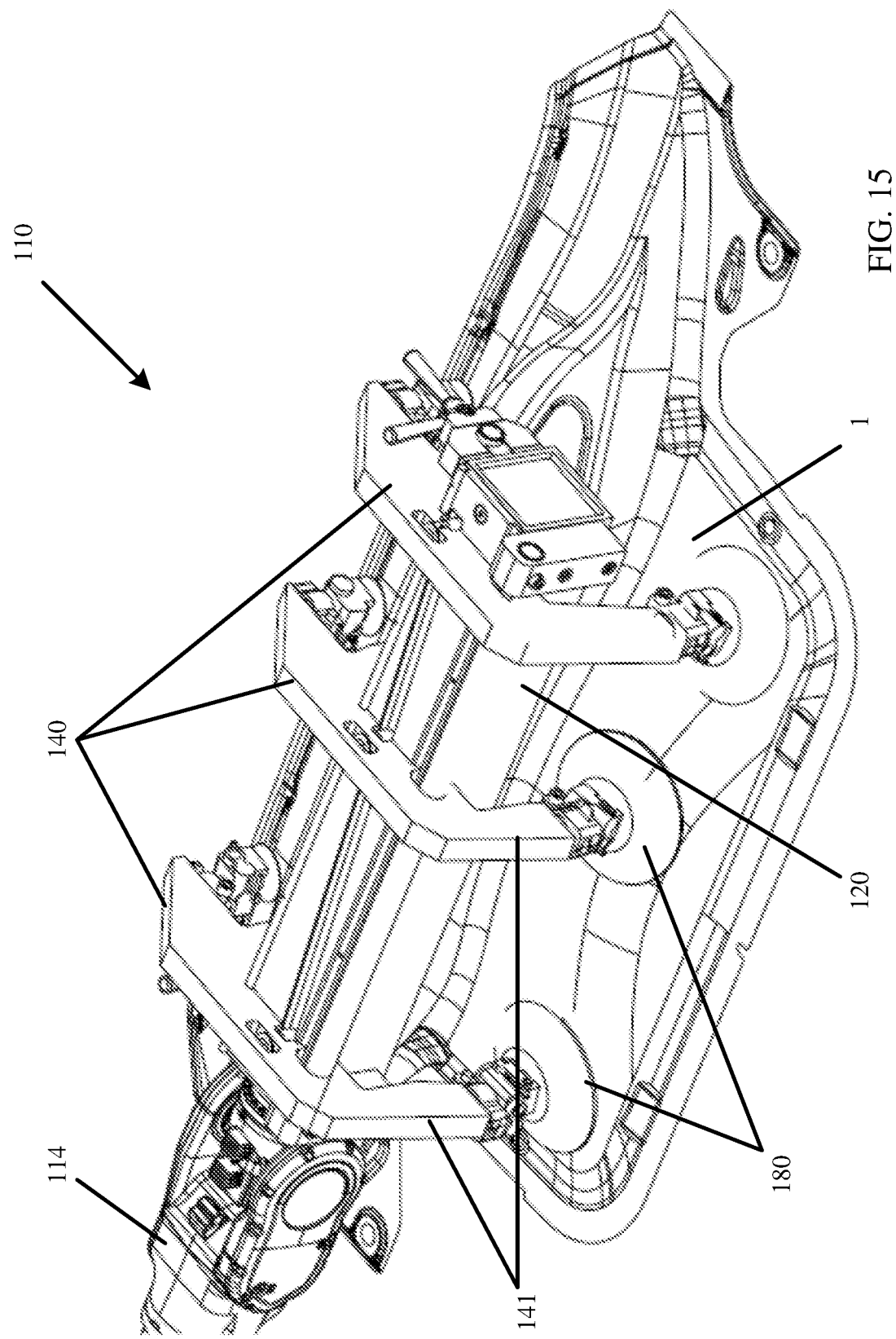
FIG. 15 is a perspective view of a manufacturing system according to yet another embodiment.
Figure 16:
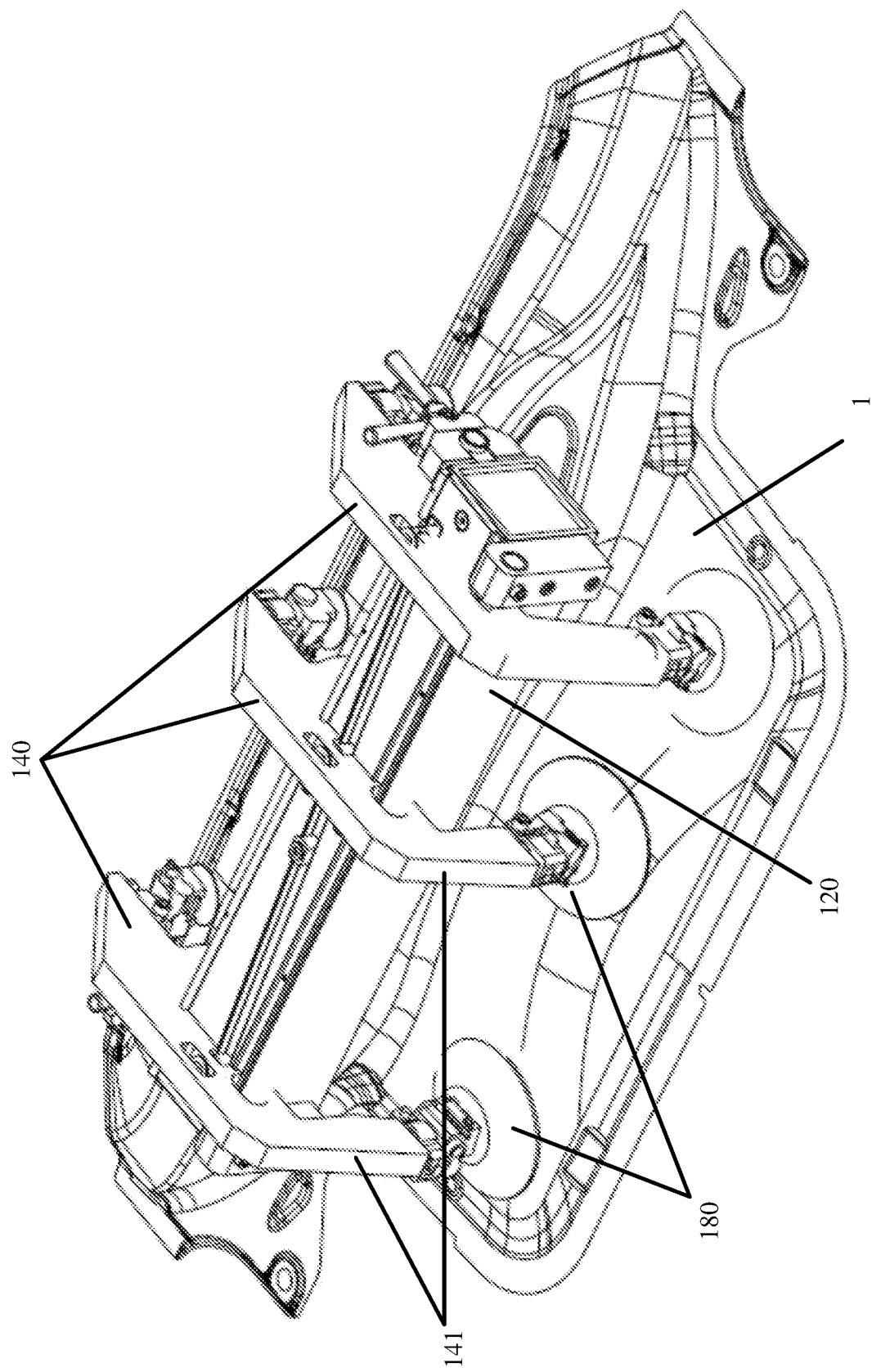
FIG. 16 is a perspective view of a template support and set of template members shown in FIGS. 14 and 15.

According to the embodiments shown in FIGS. 14-16, a manufacturing system 110 is configured to lift and move or manipulate a workpiece 1. The manufacturing system 110 includes a workpiece transfer system 114, such as a robotic arm or tri-axis system. A template support 120 is configured substantially similar to the template support 20 described previously (refer to discussion above), but is adapted to be coupled to and supported by the transfer system 114 at a proximate end of the structural member 122 (as opposed to being supported by a stationary base 12). A plurality of template members 140 are configured substantially similar to the template member 40 described previously (refer to discussion above), but omit the contours of the upper surface 40a and instead include lifting tools 180 configured to engage and couple to an upper surface of the workpiece 1 (as opposed to engaging an underside of the workpiece 1).

On one or both transverse sides of the template support 120, the template member 40 extends downward below a lowermost surface of the template support 120, or such that the lifting tools 180 extend below the template support 120 or can otherwise engage an upper surface of the workpiece 1. Each template member 140 is positioned at a predetermined axial location along the template support 120, and includes one or more arms 141 to which is coupled one lifting tool 180. One of the arms 141 may also engage the locking rail as described above (refer to locking rail 34). The lifting tool 180 is specifically configured according to the three-dimensional profile of the workpiece 1. More specifically, each arm 141 and the lifting tool 180 coupled there to are cooperatively configured for the lifting tool 180 to be supported in a fixed spatial position and orientation complementary to the three-dimensional profile of the workpiece 1 at a corresponding axial location along the template support 120. The spatial position of the lifting tool 180 may include both an elevation and a transverse distance relative to the template support 120. The orientation of the lifting tool 180 may include roll and pitch relative to an axis of the template support 120, as well as yaw depending on the geometry of the lifting tool 180. Accordingly, for a given set of template members 140 associated with a workpiece 1 of a particular design, one or more lifting tools 180 may be fixedly or adjustably coupled to each template member 140 in a specific position and orientation corresponding to the specific three-dimensional profile of the workpiece 1. The position and orientation of each lifting tool 180 may vary based on the axial position of the mounting template 140 relative to the template support 120, and may be unique as compared to other lifting tools 180.

In order to couple the each lifting tool 180 to the template member 140 in its predetermined position and orientation, a bottom end of the arm 141 may extend downwardly and transversely relative to the template support 120 and corresponding features of the template member 140 (e.g., refer to the first slot 42a and the second slot 44a described above). The bottom end of the arm 141 may also be angled appropriately to place the lifting tool 180 in its predetermined position and orientation. For example, the bottom end of the arm 141 may be parallel with the lower surface (refer to surface 46a above), or may extend at another in-plane angle (e.g., to have a constant two-dimensional cross-section to be formable by a conventional router bit). Instead or additionally, an intermediate member having a unique shape (i.e., corresponding to the three-dimensional profile of the workpiece 1) may be coupled to the bottom end 141 of the arm 141, or the lifting tool 180 may include mechanisms (e.g., a ball and socket arrangement) for adjusting and fixing the orientation of the lifting tool relative to the bottom end 141 a surface to which it is coupled (e.g., the bottom end of the arm 141).

While the disclosure has been made in connection with what is presently considered to be the most practical and preferred embodiment, it should be understood that the disclosure is intended to cover various modifications and equivalent arrangements.

What is claimed is:

1. A manufacturing system comprising:
   a support system including a primary structure extending in an axial direction, a first rail fixedly coupled to and extending parallel with the primary structure, and a second rail movably coupled to the primary structure to be movable transversely between an inward position and an outward position in which second rail is parallel with the primary structure;
   a set of template members that are removably coupleable to the support system at different axial positions for cooperatively supporting a workpiece;
   wherein the second rail is movable toward the inward position to receive and release the template members from the support system.

2. The manufacturing system according to claim 1, wherein the second rail is movable toward the outward position to couple the template members to the support system with the second rail.

3. The manufacturing system according to claim 2, wherein the second rail is lockable in the outward position to lock the template members to the support system with the second rail.

4. The manufacturing system according to claim 1, wherein each said template member includes a first recess for receiving the first rail, and a second recess for receiving the second rail for coupling the template member to the support system.

5. The manufacturing system according to claim 4, wherein the template member includes a first portion defining the first recess, a second portion defining the second recess, and a third portion extending transversely between the first portion and the second portion.

6. The manufacturing system according to claim 1, wherein each said template member includes an upper surface uniquely contoured in a complementary manner to an underside of the workpiece.

7. The manufacturing system according to claim 6, wherein each said template member includes two planar axial faces and has a substantially constant outer peripheral shape moving in the axial direction.

8. The manufacturing system according to claim 1, wherein the primary structure includes a first side, a second side, and an upper side extending transversely between the first side and the second side, wherein the first rail is positioned outward of the first side and at least partially above the upper side, and the second rail is positioned outward of the second side and at least partially below the upper side.

9. The manufacturing system according to claim 1, wherein each said template member is coupleable to the support system with the second rail at only one of the axial positions.

10. The manufacturing system according to claim 9, wherein the support system further comprises a locating plate coupled to the primary structure and forming an upper surface of the support system, wherein the locating plate includes a locating slot therein; and wherein each said template member includes a locating member that protrudes from a lower surface of the template member and has a unique transverse position along the lower surface as compared to the locating member of each other of said template members, wherein each said template member is coupleable to the support system with the second rail at only one of the axial positions in which the locating member is also receivable within the slot.

11. The manufacturing system according to claim 10, wherein the locating slot extends straight at a non-zero angle relative to the axial direction.

12. The manufacturing system according to claim 1, wherein each template member includes two planar faces, and the template members of the set are coupleable to each other with one planar face of each said template member contacting at least one planar face of any adjacent template member.

13. The manufacturing system according to claim 1, further comprising a second template support and a second set of template members associated therewith, wherein the set of template members is associated with the template support and includes a first mechanical code feature that prevents coupling to the second template support, and the second set of template members includes a second mechanical code that prevents coupling to the template support.

14. The manufacturing system according to claim 1, wherein the second rail is movable toward the outward position to couple the template members to the support system with the second rail; wherein each template member includes a first recess for receiving the first rail, and a second recess for receiving the second rail for coupling the template member to the support system; wherein each said template member includes an upper surface uniquely contoured in a complementary manner to an underside of the workpiece; wherein the primary structure includes a first side, a second side, and an upper side extending transversely between the first side and the second side, wherein the first rail is positioned outward of the first side and at least partially above the upper side, and the second rail is positioned outward of the second side and at least partially below the upper side; wherein each said template member is coupleable to the support system with the second rail at only one of the axial positions.

15. A manufacturing system comprising: a template support; and a plurality of template members removably coupleable to the template support at spaced apart axial positions, and being configured to cooperatively support a workpiece; wherein the template support comprises: a structural member having a first side and a second side extending axially between a first end and a second end of the structural member, a first rail fixedly coupled to the structural member, wherein the first rail is positioned outward of the first side of the structural member and extends parallel with the structural member, and a second rail movably coupled to the structural member, wherein the first rail is positioned outward of the first side of the structural member, and is normally biased outward relative to the structural member from an inward position to an outward position in which second rail is parallel with the structural member; wherein each said template member comprises: an upper surface uniquely contoured in a complementary manner to an underside of the workpiece; a first recess receivable on the first rail; and a second recess receivable on the second rail; wherein each said template member is coupled to the template support when the first rail is positioned in the first recess and the second rail is in the outward position in the second recess, and is removable from the template support when the second rail is in the inward position and out of the second recess.

* * * * *